(12) United States Patent
Chi et al.

(10) Patent No.: US 9,937,668 B2
(45) Date of Patent: Apr. 10, 2018

(54) CONTROL DEVICE FOR 3D PRINTER

(71) Applicant: LG ELECTRONICS INC., Seoul (KR)

(72) Inventors: Jumin Chi, Seoul (KR); Jieun Lee, Seoul (KR); Youngwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 577 days.

(21) Appl. No.: 14/592,665

(22) Filed: Jan. 8, 2015

(65) Prior Publication Data

US 2015/0283763 A1    Oct. 8, 2015

(30) Foreign Application Priority Data

Apr. 8, 2014    (KR) .......................... 10-2014-0041951

(51) Int. Cl.
| | |
|---|---|
| *G06F 19/00* | (2011.01) |
| *B29C 67/00* | (2017.01) |
| *G05B 15/02* | (2006.01) |
| *B29C 64/386* | (2017.01) |
| *B33Y 50/02* | (2015.01) |

(52) U.S. Cl.
CPC ........ *B29C 67/0088* (2013.01); *B29C 64/386* (2017.08); *G05B 15/02* (2013.01); *B33Y 50/02* (2014.12)

(58) Field of Classification Search
CPC .................................................. B29C 67/0088
USPC .................................................. 700/117–129
See application file for complete search history.

(56) References Cited

U.S. PATENT DOCUMENTS

| 5,490,962 | A | * | 2/1996 | Cima ...................... A61F 2/022 |
| | | | | 156/272.8 |
| 5,518,680 | A | * | 5/1996 | Cima ...................... A61F 2/022 |
| | | | | 156/272.8 |
| 5,807,448 | A | * | 9/1998 | Nakazawa .............. G06F 17/50 |
| | | | | 156/350 |
| 2012/0168985 | A1 | | 7/2012 | Klaber |
| 2013/0215454 | A1 | * | 8/2013 | Tan ..................... B29C 67/0088 |
| | | | | 358/1.15 |

FOREIGN PATENT DOCUMENTS

| CN | 102802449 | 11/2012 |
| CN | 103350508 | 10/2013 |

(Continued)

OTHER PUBLICATIONS

Meitl, Matthew A., et al. "Transfer printing by kinetic control of adhesion to an elastomeric stamp." Nature materials 5.1 (2006): pp. 33.*

(Continued)

*Primary Examiner* — Satish Rampuria
(74) *Attorney, Agent, or Firm* — Lee, Hong, Degerman, Kang & Waimey

(57) ABSTRACT

Disclosed is a control device for a 3D printer, which controls the 3D printer including a supply unit for supplying a forming material and a degradable agent, and a printing unit for printing a 3D object. The control device includes a display unit and a controller. The display unit outputs screen information for setting a use period of the 3D object. The controller controls the addition amount of the degradable agent, based on the set use period.

17 Claims, 23 Drawing Sheets

(56) References Cited

FOREIGN PATENT DOCUMENTS

CN      203344500      12/2013
JP      10-323810      12/1998

OTHER PUBLICATIONS

Symes, Mark D., et al. "Integrated 3D-printed reactionware for chemical synthesis and analysis." Nature chemistry 4.5 (2012): pp. 349.*
Kitson, Philip J., et al. "Configurable 3D-Printed millifluidic and microfluidic 'lab on a chip' reactionware devices." Lab on a Chip 12.18 (2012): pp. 3267-3271.*
Chinese Patent Application No. 201510090064.X, Office Action dated Sep. 27, 2016, 6 pages.
Notice of Allowance issued in Korean Patent Application No. 10-2014-0041951, dated Jun. 29, 2016, 7 pages.
Korean Intellectual Property Office Application Serial No. 10-2014-0041951, Office Action dated Nov. 20, 2015, 5 pages.

* cited by examiner

CONTROL DEVICE FOR 3D PRINTER

CROSS-REFERENCE TO RELATED APPLICATIONS

Pursuant to 35 U.S.C. § 119(a), this application claims the benefit of earlier filing date and right of priority to Korean Application No. 10-2014-0041951, filed on Apr. 8, 2014, the contents of which are all hereby incorporated by reference herein in it entirety.

BACKGROUND OF THE INVENTION

1. Field of the Invention

The present disclosure relates to a control device for a three-dimensional (3D) printer outputting digitized 3D products.

2. Description of the Conventional Art

In general, a 3D printer uses a printing technique of producing a 3D object by stacking consecutive layers of a material. The 3D printer can quickly produce a 3D object, based on user's desired 2D information, and thus is applied to production of a prototype sample, and the like.

The technique of the 3D printer includes a modeling process of forming a design drawing of a 3D object, a printing process of actually producing the object by stacking a material, and a treating process of hardening or surface-treating the printed object. A method of implementing the 3D printer according to the printing process may be generally divided into a method of stacking the material by irradiating an ultraviolet (UV) laser onto a liquid material film and curing the liquid material film, a method of stacking the material by dropping material ink using an ink-jet head and curing the material ink, and a method of staking the material by irradiating a UV beam onto a material layer in a desired pattern using a projector and curing the material layer. The implementation method of the 3D printer may be divided into a method using liquid, a method using powder, a method using solid, and the like.

Various shapes desired by users can be freely printed by 3D printers, and thus the 3D printers can be variously applied to manufacturing, medical and IT fields.

Accordingly, the use of disposable products printed by the 3D printers is generalized, and therefore, environmental pollution caused by an increase in waste with respect to objects easily printed by the 3D printers increases.

In addition, food formed with edible materials by the 3D printers may be produced, and accordingly, people's health may be threatened.

SUMMARY OF THE INVENTION

Therefore, an aspect of the detailed description is to provide a control device for a 3D printer, which enables a use period of an object produced by the 3D printer to be set.

To achieve these and other advantages and in accordance with the purpose of this specification, as embodied and broadly described herein, a control device for a 3D printer, the 3D printer including a supply unit for supplying a forming material and a degradable agent, and a printing unit for printing a 3D object, is disclosed. The control device includes: a display unit configured to output screen information for setting a use period of the 3D object; a controller configured to determine an amount of the degradable agent to be added to the 3D object based on the set use period and configured to generate a control signal for controlling the 3D printer, the control signal being indicative of the determined amount of the degradable agent; and a communication unit configured to transmit the control signal to the 3D printer.

In one exemplary embodiment, the controller may control the size of the 3D object, based on a remaining amount of the forming material and the use period.

In one exemplary embodiment, the screen information may include a control image for setting a number of the 3D objects. The controller may control the number of the 3D objects, the size of the 3D object and the use period of the 3D object.

In one exemplary embodiment, the control image may include a shape corresponding to the 3D object. The controller may change at least one of the shape and size of a portion of the 3D object, based on a touch input applied to one area of the control image.

In one exemplary embodiment, the control image may correspond to a portion of a photograph obtained by imaging an object.

In one exemplary embodiment, the control device may further include a camera configured to image the object. The controller may set the size of the 3D object, based on the object of the image obtained by the camera.

In one exemplary embodiment, the control device may further include a memory configured to store standard information of the imaged object. The controller may set the size of the 3D object, based on the standard information.

In one exemplary embodiment, the display unit may display a shape selected by a user. The controller may set an internal structure recessed to correspond to the shape from one surface of the 3D object.

In one exemplary embodiment, the control device may further include a memory configured to store information on the function and shape of a 3D object. The display unit may output a function setting window including information on at least one function to allow the function of the 3D object to be selected. The controller may control the 3D printer to print the 3D object in a shape corresponding to the function selected by the function setting window.

In one exemplary embodiment, the forming material may be composed of at least one of a first edible material and a second inedible material, and the degradable agent may be composed of a plurality of degradable materials. The controller may control the 3D object to be printed with some of the plurality of degradable materials, based on the first and second materials.

In one exemplary embodiment, when the 3D object is set to be formed of a biodegradable material degraded as time elapses, the display unit may output an available period of the 3D object, calculated based on the use period and size or capacity of the 3D object, set by the user. The controller may control the addition amount of the degradable agent, based on the available period of the 3D object and the use period set by the user.

In one exemplary embodiment, when the 3D object is set to include the first material, the controller may add a degradation prevention material for suppressing the degradation, based on the available use period of the first material and the use period set by the user.

In one exemplary embodiment, when a component of the 3D object is composed of the first material, the display unit may output an age input window for receiving a user's age.

In one exemplary embodiment, the controller may change the printing number of the 3D objects and the size or capacity of the 3D object, based on the user's age.

In one exemplary embodiment, the controller may add an additive constituting the 3D object, based on the user's age. The additive may include at least one of a vitamin element and a digestive element.

In one exemplary embodiment, when the component of the 3D object is composed of the first material, the display unit may output a password input window for receiving a password input by the user. When the input password does not correspond to a previously set password, the controller may activate a locking function of limiting control of the 3D printer.

In one exemplary embodiment, the display unit may output a text input window for receiving a text formed on an outer surface of the 3D object.

In one exemplary embodiment, the control device may further include a memory configured to store data of a printed 3D object. The controller may control the display unit to output screen information including a discardable position of the 3D object, based on the data.

In one exemplary embodiment, the data of the 3D object may include at least one of a printing date of the 3D object, a material constituting the 3D object, a use period of the 3D object and a use of the 3D object.

According to the present invention, as a 3D object including a material degraded according to an elapse of time is formed, and a user's desired use period of the 3D object is specified, the degradation time of the 3D object can be adjusted. Further, as information on a discarding place is provided, it is possible to prevent an increase in waste, caused by printing of the 3D object.

In addition, the printing of a 3D object of an appropriate shape is possible through only setting of use, and thus a desired object can be more easily printed and used. When a 3D object including an edible material is printed, the kind of the material and the printing amount of the 3D object can be adjusted, thereby preventing a problem caused by indiscreet intake of the 3D object.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail of the exemplary embodiments, with reference to the accompanying drawings. For the sake of brief description with reference to the drawings, the same or equivalent components will be provided with the same reference numbers, and description thereof will not be repeated.

A 3D printer described in the present disclosure is not limited to methods for producing objects. For example, the 3D printer applied to the present disclosure may be driven by a method for printing a 3D object by spraying a liquid light-curing or thermosetting material layer by layer and then curing the liquid light-curing or thermosetting material using ultraviolet (UV), a method for forming a 3D object by heating and melting a thermoplastic to a semi-liquid state and then extruding the thermoplastic, a method for forming a 3D object by spraying and solidifying a material in a thread or powder form, or the like.

Figure 1A:
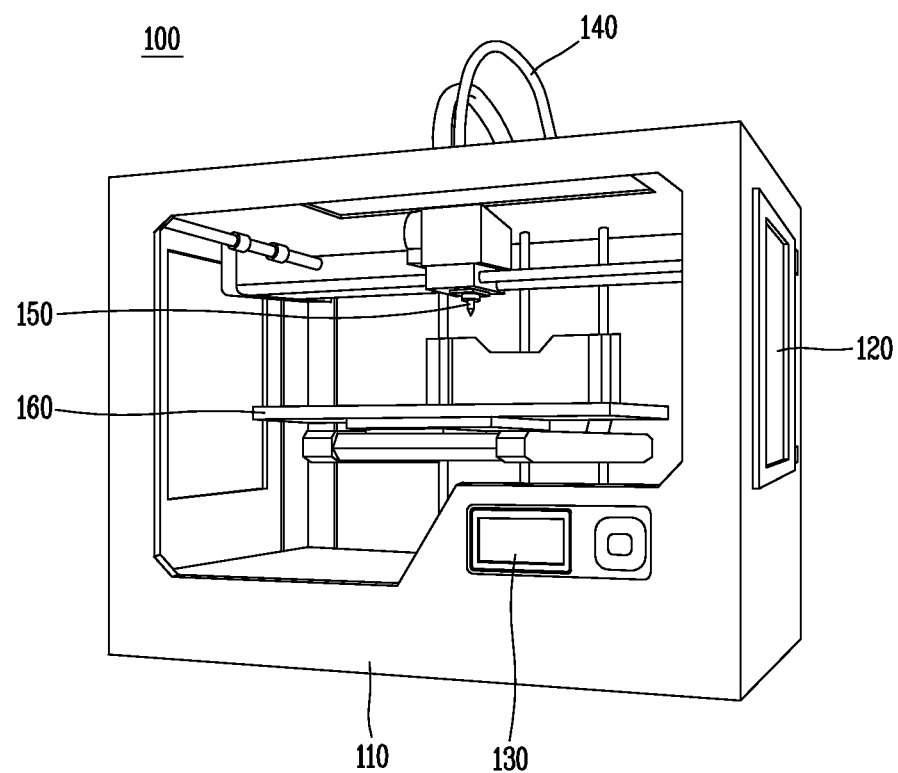
FIG. 1A is a view of a 3D printer viewed in one direction according to an exemplary embodiment.

FIG. 1A is a conceptual view of a 3D printer according to an exemplary embodiment. The present invention provides a control device for controlling the 3D printer to print a user's desired 3D object.

Referring to FIG. 1A, the 3D printer 100 includes a body unit 110, a supply unit 120, a display unit 130, a supply line 140, a nozzle unit 150 and a working platform 160.

The supply unit 120 is formed inside the body unit 110. A forming material used to print a 3D object may be stored in the supply unit 120. A user may charge a predetermined forming material to the supply unit 120. The forming material may be made of various forms of materials. Particularly, components constituting the 3D object according to the exemplary embodiment may include a degradable material degraded as time elapses and a degradable agent assisting the degradation of the degradable material.

The display unit 130 is formed on an outer surface of the body unit 110, and may further include a touch sensing unit for receiving a user's touch input. The display unit 130 may receive a user's control command for forming the 3D object or receive a touch input for setting conditions for forming the 3D object. The display unit 130 may output information on a driving state of the 3D printer. That is, the display unit 130 may output a graphic image for receiving a user's control command to control the 3D printer.

The nozzle unit 150 is configured to allow a printing object to be formed by various methods using the material. For example, the nozzle unit 150 may be configured to spray a liquid or solid forming material or to cure or melt a forming material by applying heat or light to the forming material.

The supply line 140 for moving the material to the nozzle unit 150 may be formed between the nozzle unit 150 and the supply unit 120. The working platform 160 is an area on which a 3D object is formed, and may be disposed adjacent to the nozzle unit 150. The printed 3D object may be disposed on the working plate 160. The 3D printer 100 may include a plurality of movement axes for moving the nozzle unit 150 in order to form various shapes of 3D objects.

However, the structure of the supply line 140 and the nozzle unit 150 may be configured in various forms by methods for forming the 3D object.

Although not specifically shown in this figure, the 3D printer 100 includes a controller for controlling the printing of a 3D object, based on a user's control command.

A control device for the 3D printer according to an exemplary embodiment may be configured with the controller and the display unit 130. The controller (not shown) detects state information of components constituting the 3D printer, and generates a control signal for driving the 3D printer, based on a control command applied through the display unit 130.

A control device for the 3D printer according to another exemplary embodiment may be implemented as an external device communicating with the 3D printer.

Figure 1B:
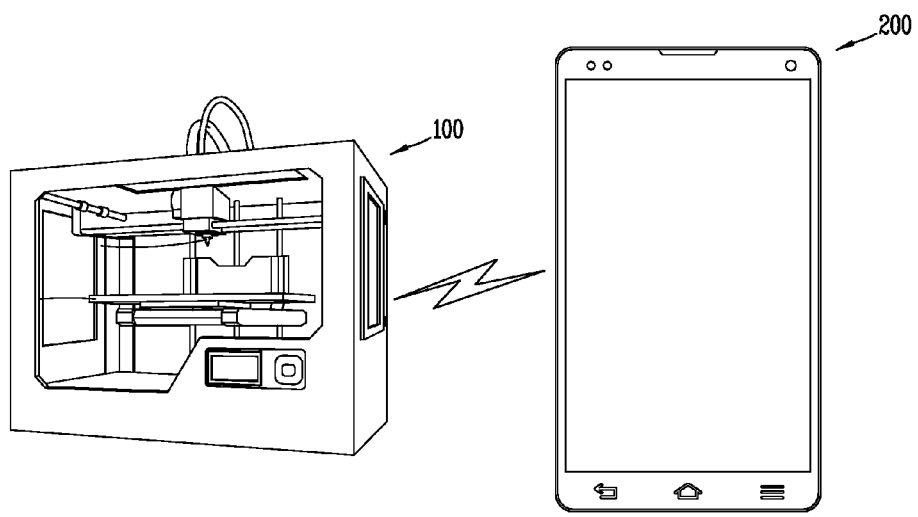
FIG. 1B is a view illustrating the 3D printer performing wireless communication with a control device implemented as an external device.
Figure 1C:
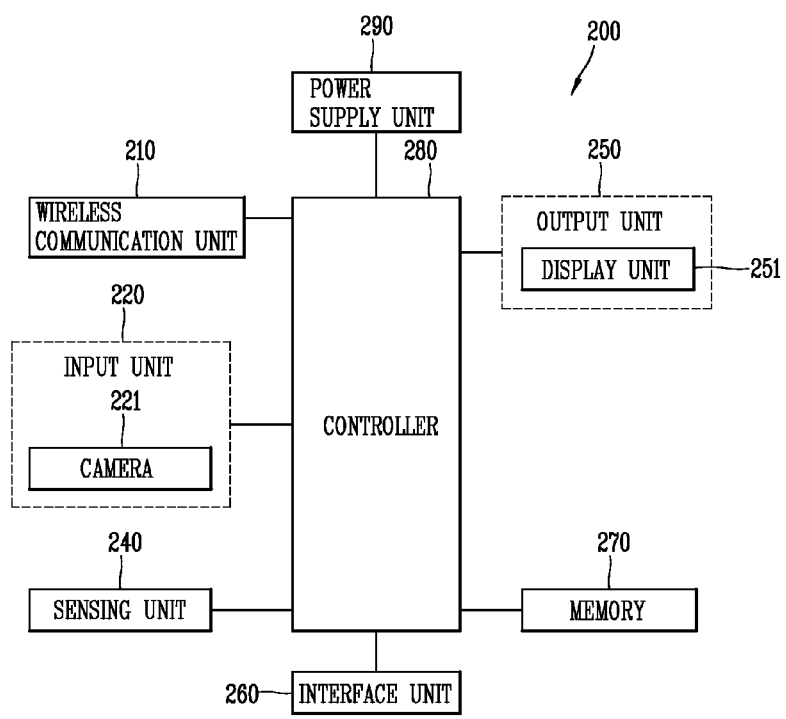
FIG. 1C is a configuration view of the control device implemented as an external device according to an exemplary embodiment.

FIGS. 1B and 1C are conceptual views illustrating a control device for the 3D printer, implemented as an external device. The control device 200 may be implemented as a mobile terminal. In this case, the 3D printer 100 and the control device 200 can communicate with each other by wire or wireless.

FIG. 1C is a configuration view illustrating a configuration of the control device 200 implemented as a mobile terminal. The control device 200 may include a cellular phone, a smart phone, a laptop computer, a terminal for digital broadcasting, a personal digital assistant (PDA), a portable multimedia player (PMP), a navigation, a slate PC, a tablet PC, an ultrabook, a wearable device (e.g., a smart watch, a smart glass or a head mounted display (HMD)), and the like.

The control device 200 may include a wireless communication unit 210, an input unit 220, a sensing unit 240, an output unit 250, an interface unit 260, a memory 270, a controller 280, a power supply unit 290, and the like. The components shown in FIG. 1C are not essential to implement the mobile terminal. Therefore, the mobile terminal may have a larger or smaller number of components than the components listed in the above.

More specifically, the wireless communication unit 210 among the components may include one or more modules for enabling wireless communication between the control device 200 and a wireless communication system or between the control device 200 and an external server. The wireless communication unit 210 may include one or more for connecting the control device 200 to one or more networks.

The input unit 220 may includes a camera 221 or image input unit for inputting image signals, a microphone or audio input unit for inputting audio signals, etc. Voice data or image data collected by the input unit may be analyzed and processed as a user's control command.

The sensing unit 240 may include one or more sensors for sensing at least one of information in the mobile terminal, peripheral environment information of the mobile terminal and user information.

The output unit 250 is used to generate an output related to sense of sight, sense of hearing, or sense of touch, and may include a display unit 251, a sound output unit, a haptic module, and the like. The display unit 251 may have a layered structure with a touch sensor or be integrally formed with the touch sensor, thereby implementing a touch screen. The touch screen may act as a user input unit for providing an input interface between the control device 200 and the user, and simultaneously provide an output interface between the control device 200 and the user.

The interface unit 260 performs the function of a passage with various kinds of external devices connected to the control device 200.

The memory 270 stores data for supporting various functions of the control device 200. The memory 270 may store a plurality of application programs or applications driven in the control device 200, and data and commands for operations of the control device 200. At least some of the application programs may be downloaded from an external server through wireless communication.

The controller 280 controls general operations of the control device 200, in addition to operations related to the application programs. The controller 280 may process signals, data, information, etc., input or output through the components described above, or drive an application program stored in the memory 270, thereby providing the user with or processing appropriate information or function.

The power supply unit 290, under the control of the controller 280, receives external power or internal power to supply the received power to the components included in the control device 200.

At least some of the components may operate in cooperation with one another in order to implement operations, controls or control methods of the mobile terminal according to various exemplary embodiments, which will be described below. The controller 280 of the control device 200 according to the exemplary embodiment may include state information of the 3D printer from the 3D printer. The controller 280 may control the wireless communication unit 210 to transmit, to the 3D printer 100, a control signal formed based on a control command applied to the display unit 251, and accordingly, the driving of the 3D printer can be controlled.

Hereinafter, the control device for controlling the 3D printer will be described in detail.

Figure 2A:
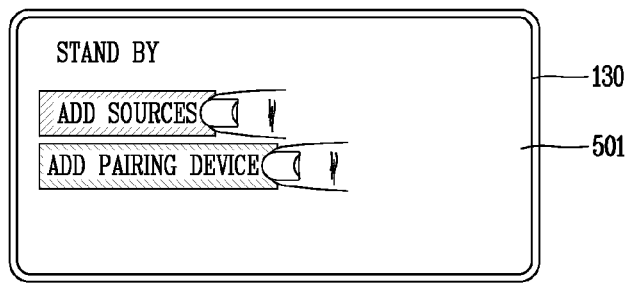
FIGS. 2A(a), 2A(b), 2A(c), 2A(d), 2B, 2C(a) and 2C(b) are conceptual views illustrating control methods for the 3D printer of FIG. 1 according to various exemplary embodiments.
Figure 2A:
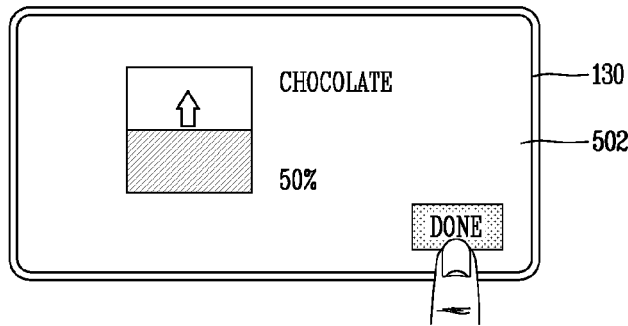
Figure 2A:
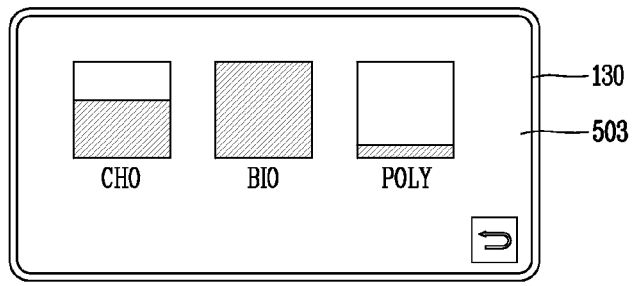
Figure 2A:
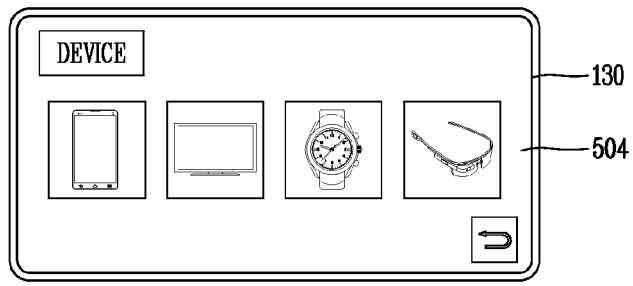
Figure 2B:
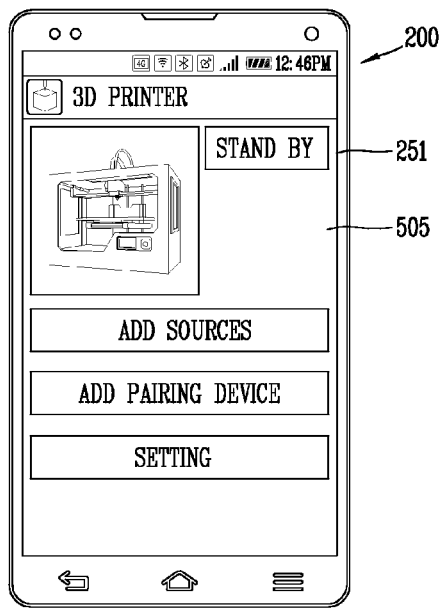
Figure 2C:
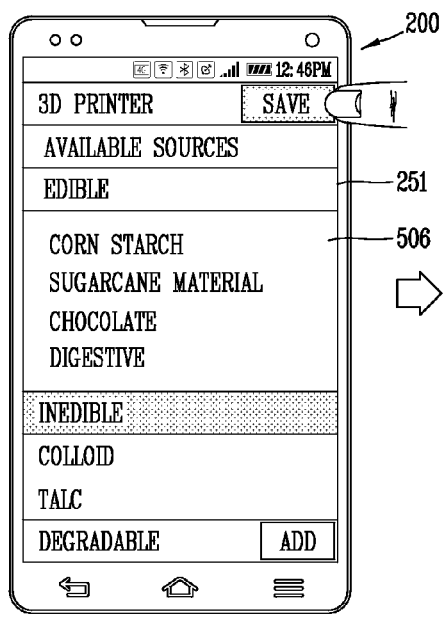
Figure 2C:
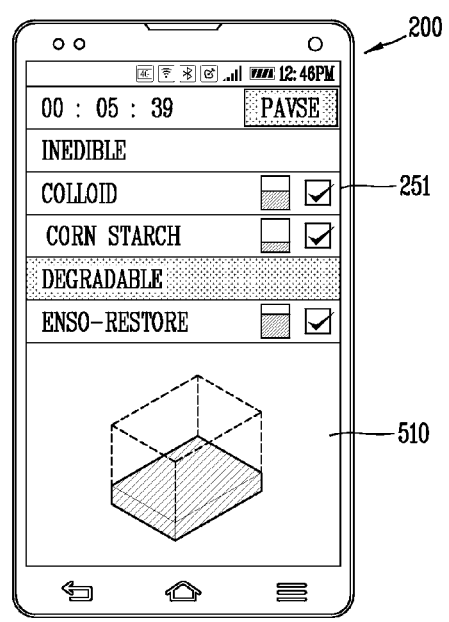

FIGS. 2A to 2C are conceptual views illustrating control methods for the 3D printer of FIG. 1A according to various exemplary embodiments.

FIGS. 2A(a), 2A(b), 2A(c) and 2A(d) are conceptual views illustrating a control method for the 3D printer using the display unit of FIG. 1A.

FIG. 2A(a) is a conceptual view illustrating first screen information 501 which includes state information of the 3D printer and is output to the display unit 130. The first screen information 501 may be output in a driving state or standby state of the 3D printer.

Here, the standby state means a state in which the power of the printer is on, but a printing unit of the 3D printer does not print a 3D object. In the standby state, the user may control a 3D object to be printed or charge a forming material and a degradable agent.

The first screen information 501 may include a graphic image for receiving a user's selection in order to charge a forming material or pair with an external device.

Referring to FIGS. 2A(a) and 2A(b), if a touch input is applied to a graphic image (ADDING SOURCES) for charging the forming material, the display unit 130 outputs second screen information 502. The second screen information 502 may include information on the kind of the forming material and the remaining amount of the forming material (or the current charging rate of the forming material depending on the storage capacity of the supply unit). Although an image representing the current charging rate of one forming material (CHOCOLATE) is shown in FIG. 2A(b), the present invention is not limited thereto. For example, the second screen information 502 may include a list including information on a plurality of forming materials.

FIG. 2A(c) is a conceptual view illustrating third screen information 503 output on the display unit 130 according to another exemplary embodiment. The third screen information 503 includes a plurality of images respectively representing remaining amounts or current charging rates of the plurality of forming materials stored in the supply unit 120.

However, the present invention is not limited thereto, and the third screen information 503 may include elements of a forming material and a degradable agent, stored in the supply unit 120, information on the presence of an edible material, and specific information of the forming material including the hardness of the forming material, the incense of the forming material, the flavor of the forming material, and the like.

Alternatively, when it any one of the forming material and the degradable agent is stored to a predetermined reference capacity or less in the supply unit 120, the controller may output information on the result. Here, the reference capacity may correspond to an amount of a material set by the user or a minimum amount of a material required to form a 3D object. For example, the information may be output in the form of a warning message.

Meanwhile, the display unit 130 may output specific information on a forming material (or degradable agent) corresponding to an image selected based on a touch input applied to any one of the plurality of images.

Referring to FIGS. 2A (a) and (d), the 3D printer 100 may transmit or receive data for forming the 3D object through wireless communication with an external device, or receive a control command for forming the 3D object from the external device.

Fourth screen information 504 output to the display unit 130 may include information on an external device wireless connected to the 3D printer 100 and an external device wireless connectable to the 3D printer 100. For example, the fourth screen information 504 may be configured with icons respectively representing a plurality of external devices.

The controller may control the wireless communication unit to wireless communicate with the external device, based on a touch input applied to the icon of the external device. Although not shown in FIG. 2A(d), the controller may select a control device for controlling the 3D printer among the plurality of external devices, based on a touch input applied to the fourth screen information 504, or set an information transmitting device for transmitting information on a 3D object to be printed or an information receiving device for receiving additional information to print the 3D object among the plurality of external devices.

Referring to FIG. 1B, the 3D printer 100 may be controlled by an external control device. For example, the control device may be the form of a mobile terminal. FIGS. 2B and 2C are conceptual views illustrating a mobile terminal outputting control screens for controlling the 3D printer.

Hereinafter, a control method of the control device implemented as a mobile terminal will be described as an example, but the control device is not limited to external devices. That is, the control method which will be described below can be implemented by the controller and the display unit 130 of the 3D printer. In the following drawings, visual information displayed on the display unit may be output by the display unit 130 of the 3D printer 100. That is, the visual information which will be described below can be implemented by the display unit 130.

FIG. 2B illustrates the display unit 251 outputting a state information screen 505 of the 3D printer. The state information screen 505 may include an icon representing the 3D printer 100, a control image for receiving a user's touch input to charge a forming material and a degradable agent to the supply unit 120, a control image for selecting an external device to wireless communicate, a setting image for setting a 3D object to be printed, and the like. The display unit 251 may display a driving state (STAND BY) of the 3D printer.

FIGS. 2C(a) and 2C(b) illustrate the display unit 251 outputting a material information screen 506 including information on a forming material and a degradable agent. The material information screen 506 outputs information of material available in the 3D printer or information of materials currently stored in the supply unit 120. For example, the material information screen 506 includes edible materials, inedible materials and a degradable agent.

For example, the edible materials may include corn starch, sugarcane material, chocolate, additives such as vitamin material, and the like. The inedible materials may include polymer, thermosetting resin (e.g., acrylonitrile butadiene styrene (ABS) elastomer, rubber, PP-like material, etc.), thermoplastic resin (e.g., ABS, PC, PC-ABS, PC-ISO, nylon, PPSF, etc.), and the like.

The degradable agent is mixed with the material of the 3D object so that a portion of the 3D object is degraded or deformed in a state in which the use of the 3D object is difficult, or deformed in a state in which the ingestion of the 3D object is impossible, after a period set so that the use or ingestion of the 3D object is possible.

For example, the degradable agent may include talc, biomass, etc. Here, an ingredient extracted from grain may be used as the biomass, and a degradable ingredient extracted from potato starch, sweet potato starch, corn starch, rice flour or the like may be used as the biomass. The degradation speed of the 3D object may be adjusted depending on a content of the degradable agent included in the 3D object.

The 3D object may be made of a biodegradable plastic obtained by mixing a forming material and a degradable agent. The biodegradable plastic is degraded into low molecules from high molecules as time elapses, and the low molecules are absorbed by microbes and therefore degraded into gas. The gas may be carbon dioxide ($CO_2$), methane ($CH_4$), etc.

When the 3D object is formed of an edible material, a digestive such as a *lactobacillus* may be included in the degradable agent.

The 3D object may include an additive for promoting the degradation of the 3D object. The additive includes titanium oxide (TiO) and a biodegradable additive. The biodegradable additive may be composed of P-lite extracted from tea tree oil to have a fatty acid as a main ingredient, ENSO RESTORE that is an ingredient for accelerating natural biodegradation, polycaprolactone (PCL) which has elasticity and is degraded after about three years elapse, to be used as a medical material, and the like.

The user selects at least some of the ingredients as the additive included in the 3D object. Referring to FIGS. 2C(a) and 2C(b), the display unit 251 outputs a first control screen 510 including printing control information of the 3D object. For example, the first control screen 510 may include information on ingredients of a 3D object and remaining amounts of materials constituting the 3D object (or a current charging rate of a forming material according to the storage capacity of the supply unit 120), a printing time remaining when the 3D object is being printed or a printing time taken when the 3D object is waiting for being printed, an image representing a printing progress state of the 3D object when the 3D object is being printed, and the like.

The user may identify and regulate ingredients of the 3D object through the first control screen 510, or identify remaining amounts of materials constituting the 3D object and charge insufficient materials. When the 3D object is being printed, the user may detect a printing state of the 3D object in real time.

The controller 280 of the control device 200 may receive, at a predetermined time interval, ingredients of material stored in the supply unit 120, information on remaining amounts of the materials and a driving state of the 3D printer 100. That is, the user using the control device for the 3D printer according to the present disclosure may set conditions for forming the 3D object. Hereinafter, a control method for forming the 3D object will be described.

Figure 3A:
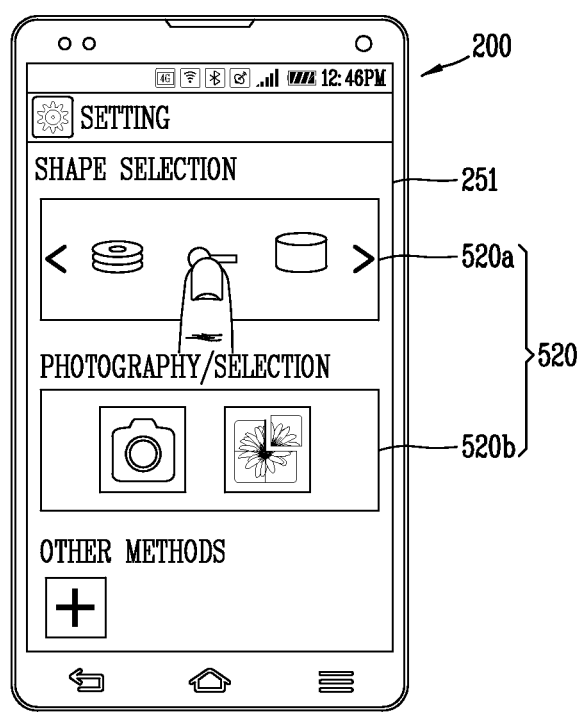
FIGS. 3A, 3B(a), 3B(b), 3B(c) and 3B(d) are conceptual views illustrating a control method for printing a 3D object.
Figure 3B:
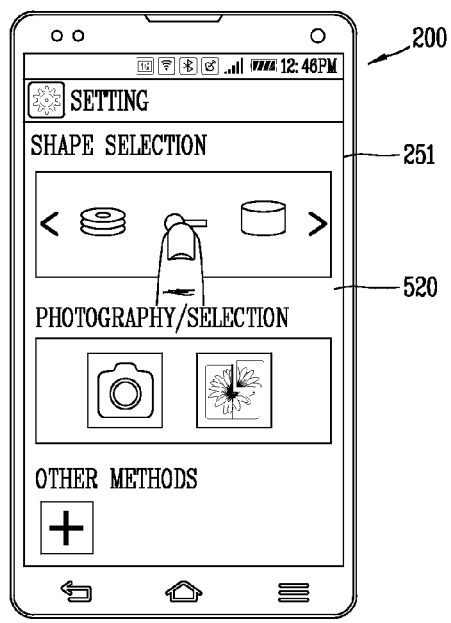
Figure 3B:
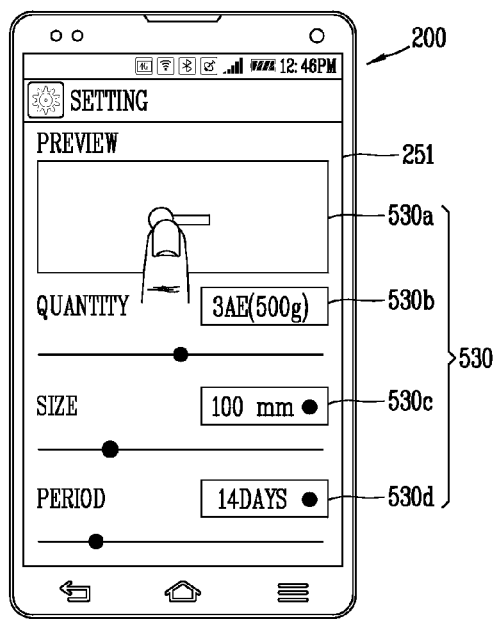
Figure 3B:
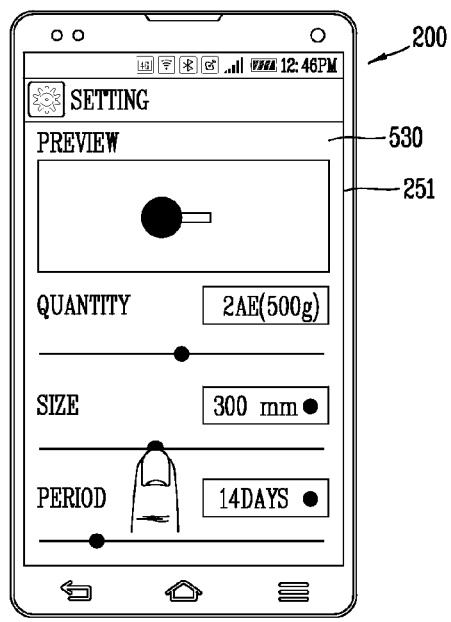
Figure 3B:
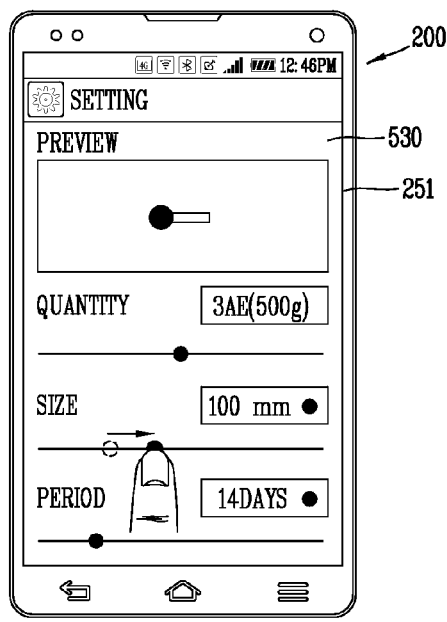

FIGS. 3A and 3B are conceptual views illustrating a control method for printing a 3D object.

FIG. 3A is a conceptual view illustrating a second control screen 520 according to an exemplary embodiment. For example, when an inedible material is selected by the user, the controller 280 controls the display unit 251 to output the second control screen 520. The user may set the shape of the 3D object through the second control screen 520.

The second control screen 520 is previously stored in the memory 270, and includes a plurality of graphic images 520*a* respectively corresponding to shapes of 3D objects to be printed and icons 520*b* respectively corresponding to various methods for receiving images.

If a touch input is applied to the graphic image 520*a*, the controller 280 forms the shape of the 3D object into the shape of the graphic image 520*a*. The memory 270 stores printing information including numerical values of the shape corresponding to the graphic image 520*a*, and the like. If any one of the plurality of graphic images 520*a* is selected, the controller 280 transmits the printing information to the printing unit of the 3D printer.

Meanwhile, if a touch input is applied to any one of the icons 520*b*, the controller 280 performs a process of collecting an image for determining the shape of the 3D object. For example, the controller 280 may control an image of external environment to be obtained by activating the camera 221 included in the control device 200, control images stored in the memory to be output on the display unit 251, or control the wireless communication unit 210 to allow the user to search for a desired image by activating a web page.

Accordingly, the user can obtain printing information on a 3D object to be output through various processes. Hereinafter, a method for controlling print settings of the 3D object will be described.

FIGS. 3B(a), 3B(b), 3B(c) and 3B(d) are conceptual views illustrating a control method for changing print settings. The controller 280 may set the shape of a 3D object by applying a touch input to the second control screen 520. If the shape of the 3D object is set, the controller 280 controls the display unit 251 to output a third control screen 530 for changing print settings of the 3D object.

The third control screen 530 may include a first control image 530*a* output as a virtual image of the 3D object to be printed, a second control image 530*b* corresponding to the number of 3D objects to be output, a third control image 530*c* for adjusting the size of the 3D object, and a fourth control image 530*d* for adjusting the use period of the 3D object.

Each of the second to fourth control images 530*b*, 530*c* and 530*d* includes a bar shape capable of adjusting an amount, based on a user's continuous touch input, and a numerical value display part for displaying the adjusted amount as a numerical value. For example, the controller 280 may change the amount (3AE) of a 3D object to be printed, based on a user's touch input moving to the left side on the second control image 530*b*.

The controller 280 determines a number of the 3D objects to be printed and a size of the 3D objects by considering at least one of the remaining amount of the forming material stored in the supply unit 120 and the remaining amount of the degradable agent stored in the supply unit 120, and outputs the determined number and size on character parts of the second and third control images 530*b* and 530*c*. The character parts may display information on the number, the size and the period as figures and units.

Referring to FIGS. 3B (b) and (c), if three 3D objects cannot be printed with the remaining amount of the forming material when the size of one area of the image of the 3D object is extended by a user's touch input, the controller 280 may decrease the number of 3D objects. That is, the controller 280 determines a number of the 3D objects to be printed and a size of the 3D objects, based on a control command applied to the second and third images 530*b* and 530*c* and the remaining amount of the forming material (and the remaining amount of the degradable agent).

The controller 280 may control any continuous touch input not to be applied to the second and third control images 530*b* and 530*c* or control the display unit 251 to limit the movement of the numerical value display part moved by the continuous touch input on the bar shape.

Alternatively, when it is decided that the 3D object is not to be printed by the remaining amount, the controller 280 may control the display unit 251 to output a notification display for notifying the charging of the forming material and the degradable agent.

The first control image 530*a* may be displayed as a 3D image viewed in one direction. The display unit 251 may output the 3D object as a 3D image viewed in another direction, based on a touch input applied to the first control image 530*a*. Accordingly, the user can predict the shape of the 3D object.

Meanwhile, one area of the 3D object may be selected based on a touch input applied to the 3D image. As shown in these figures, when the 3D object is composed of a first area in a bar shape extended in one direction and a spherical second area, the controller 280 may select any one of the first and second areas by a user's touch. That is, the user may change the shape of the 3D object, which is previously stored in the memory 270 to be basically provided.

In order to form a 3D object of which use period is set, the third control screen 530 includes the fourth control image 530*d* for receiving a user's control command to determine a use period of the 3D object.

According to the exemplary embodiment, after the shape of the 3D object is set, the user can set a number of the 3D objects to be printed, a size of the 3D objects, and a use period of the 3D objects.

The controller 280 calculates a weight of a forming material constituting the printing object according to the size of a printing object, and calculates a time for which the forming material having the calculated weight is deformed under a predetermined ambient environmental condition (e.g., room temperature (about 24° C.), one atmospheric pressure, sunlight, space filled with air including oxygen or vacuum, and the like), based on the kind of the forming material. The deformation of the forming material according to physical and chemical properties may be determined by prior analysis data on the properties of the forming material, and the analysis data may be previously stored in the memory 170 or may be received from a specific server. The predetermined ambient environmental condition is controlled by the user. For example, the user may set the temperature, moisture and the like of an ambient environment where a printing object is to be disposed, and the controller 280 may calculate an available period based on the condition set by the user.

The deformation reference of the forming material may be set by the user. For example, a case where an area of some percentages or more of the surface of a 3D object is oxidized may be set to the deformation of the 3D object, or a case where some percentages or more of the total weight of the 3D object is chemically deformed may be set to the deformation of the 3D object. Alternatively, the available period may be calculated based on the period of circulation of a forming material constituting an edible 3D object. For example, the controller 280 may strictly set a degree where a standardized 3D object is deformed, and may relatively generously set a degree where a 3D object having a decorative function is deformed.

The time for which the forming material having the weight is deformed is determined by properties of a substance included in the forming material. The controller 280 may define, as the available period, a period until before the calculated forming material is deformed after being printed, and display the available period in a use period control image 550*d*. The available period may be calculated from after the printing object is printed, but may be calculated, as the starting point of reckoning, a period where the forming material for printing the printing object is prepared.

The controller 280 can control and limit the number, size and use period set by the user, based on the remaining amounts of the forming material and the degradable agent, which become materials of the 3D object. Accordingly, the user can control print settings of the 3D object suitable for the remaining amounts of the materials, without separately confirming the remaining amounts of the materials.

Figure 3C:
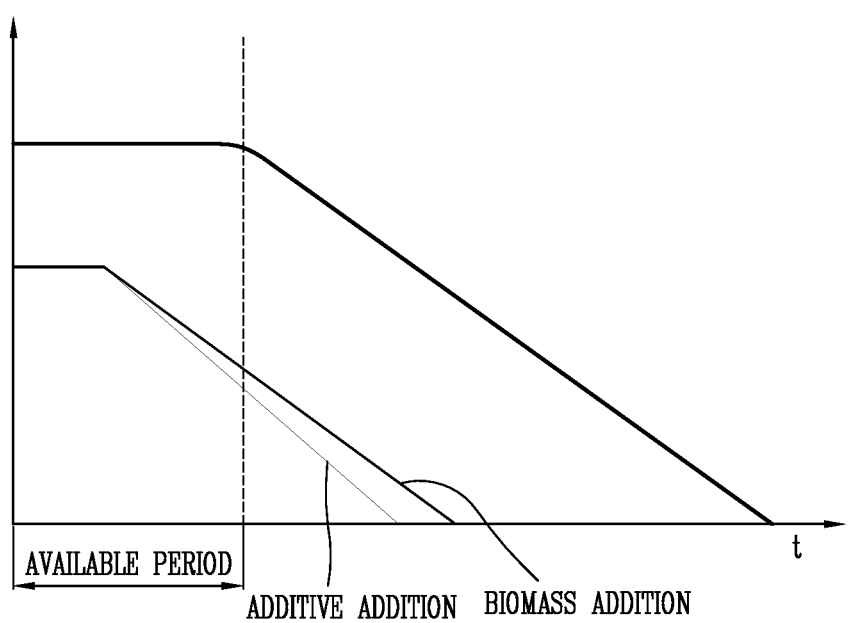
FIG. 3C is a graph illustrating degrees of degradation, based on a use period of a 3D object and an elapse of time.

FIG. 3C is a graph illustrating degrees of degradation, based on a use period of a 3D object and an elapse of time. Referring to FIG. 3C, the x-axis represents time, and the y-axis represents the degree of degradation. That is, a 3D object substantially maintains the same shape during a predetermined available period. If the available period of a 3D object formed by a specific forming material elapses, the 3D object is gradually degraded. If a specific time elapses, the shape of the 3D object is completely degraded.

For example, when biomass that is a degradable agent is included at a specific rate in the 3D object, the available period may be adjusted shorter. That is, when the use period of the 3D object is set by the fourth control image 530*d*, the controller 280 may determine an amount of the degradable agent included in the 3D object, based on the use period.

As described above, the controller 280 calculates an available period of the printed 3D object in an ambient environment where the 3D object is set, based on the kind of the material (properties of the material) constituting the 3D object, the weight of the 3D object, the condition of the set ambient environment and the deformation condition. Subsequently, when the calculated available period is changed based on a user's control command, the controller 280 may decrease or increase the deformation speed of the 3D object by adding the preservative or degradable agent.

The controller 280 may first decide whether the forming material is an edible material, and select a kind of additive (preservative or degradable agent) that reacts with the forming material of the 3D object. The controller 280 calculates an addition amount of the additive based on the weight of the 3D object, the available period set by the user and the analysis data. The controller 280 may control the display unit to provide the user with visual information that represents the selected kind of additive and the addition amount of the additive.

Figure 10A:
FIG. 10A illustrates photographs (disclosed on page 12 of the P-Life data final material) representing a degree where an HDPE bag of about 0.05 mm is degraded.

For example, a case of an HDPE film to which P-Life is added as an additive will be described with reference to data disclosed in the P-Life data final material distributed by P-Life Japan. FIG. 10A illustrates photographs (disclosed on page 12 of the P-Life data final material) representing a degree where an HDPE bag of about 0.05 mm is degraded. Referring to FIG. 10A, the bag is gradually degraded in an external space. If 103 days elapse, the bag is degraded to an extent where the initial shape of the bag cannot be recognized.

The shape of the bag for surrounding and supporting an object is preferably maintained as the use for containing the object. In the photograph corresponding 49 days, the bag is partially degraded, and therefore, the controller may specify, as about 29 days, the available period of the HDPE bag printed by a 3D printer. That is, it is expected that, if 29 days elapse, the bag is degraded and thus the shape of the bag is deformed.

Figure 10B:
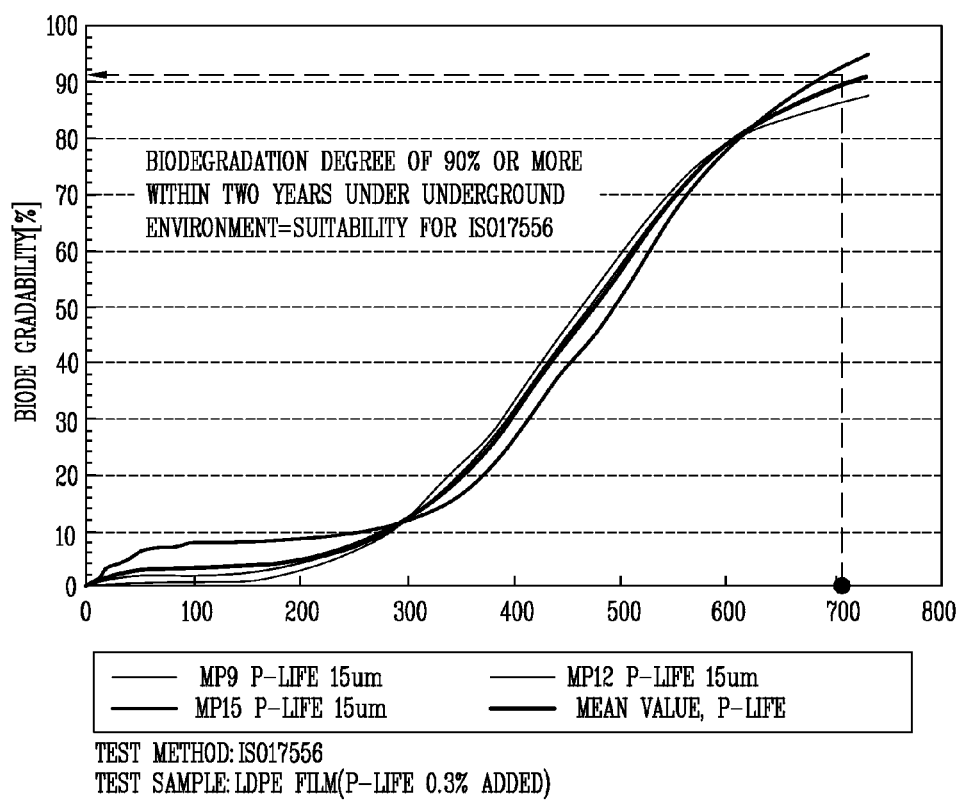
FIG. 10B is a graph representing a biodegradation test result disclosed by Bukyung Global Co. Ltd.

FIG. 10B is a graph representing a biodegradation test result disclosed by Bukyung Global Co. Ltd. Referring to FIG. 10B, in the case of an LDPE film to which P-Life of 0.3% is added, the degradation of the LDPE film is started from about 150 days. If about 200 days elapse, about 5% or less of the LDPE film is biodegraded. If about 700 days elapse, 90% or more of the LDPE film is biodegraded.

Accordingly, if the LDPE film is printed as a thin packing material, the printing object is degraded after about one year when the additive (P-Life) of about 1% is added to the printing object. When the additive (P-Life) of about 3% is added to the printing object, the printing object is degraded after about three years. Alternatively, if the LDPE film is formed in an injection structure having a thickness of about 1 mm, the printing object is degraded between about 5 and 6 years when the additive (P-Life) of about 1% is added to the printing object. When the additive (P-Life) of about 3% is added to the printing object, the printing object is degraded after about three years.

The controller may estimate an available period of the printing object, based on the use, shape and weight of the printing object, the addition amount of the additive, and data on the forming material and the additive.

The controller may control the addition amount of the additive based on the available period set by the user. For example, if a function (e.g., a bag for containing an object, or the like) of a 3D object is implemented when the degradation degree of the 3D object composed of the LDPE film is about 5% or less, the addition amount of P-Life that is a degradable agent is decreased when the use period is set longer than 200 days by the user.

The available period is output in the fourth control image 530d. Accordingly, if the use period is decreased by the user, the amount of the degradable agent to be added can be adjusted.

Meanwhile, the 3D object may further include a catalyst for promoting its degradation in order to reduce the time when the 3D object is completely degraded. For example, when the 3D object is changed into gas to disappear as time elapses, a catalyst may be added to dispose the 3D object of which use time exceeds.

Figure 4A:
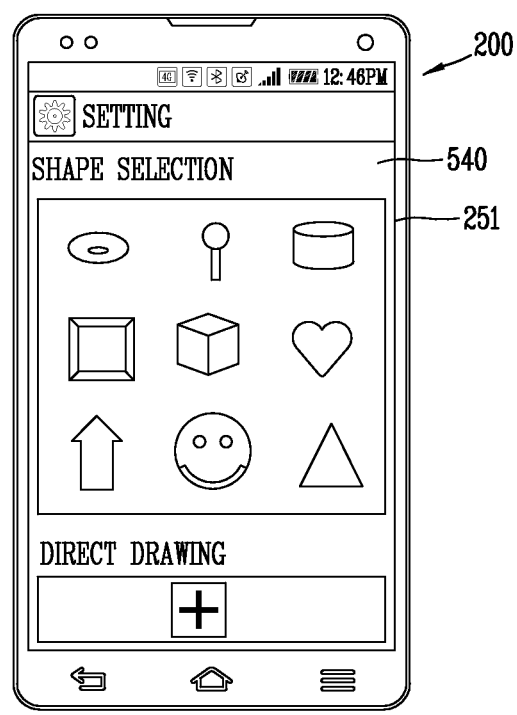
FIGS. 4A, 4B(a), 4B(b), 4B(c), 4C(a), 4C(b) and 4C(c) are conceptual views illustrating a control method for forming a 3D object using an edible forming material.
Figure 4B:
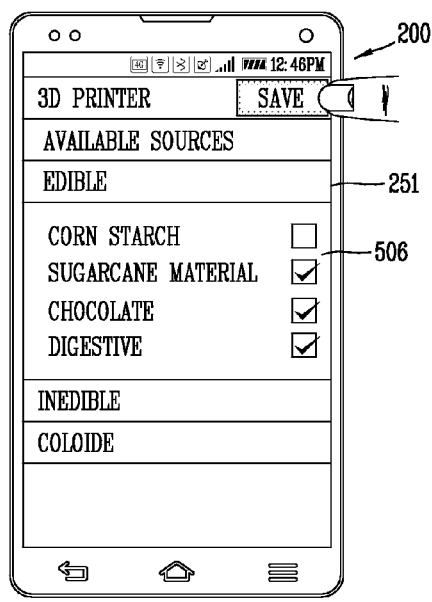
Figure 4B:
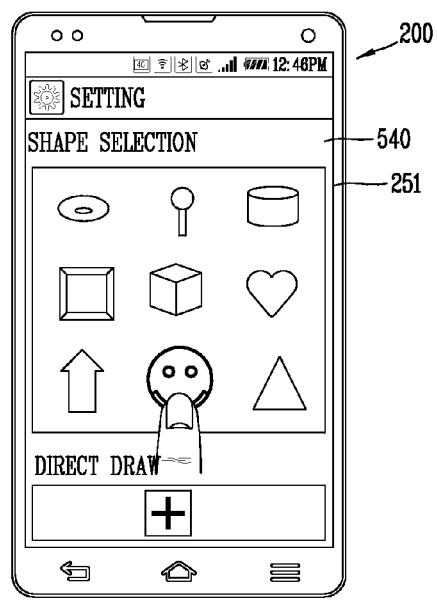
Figure 4B:
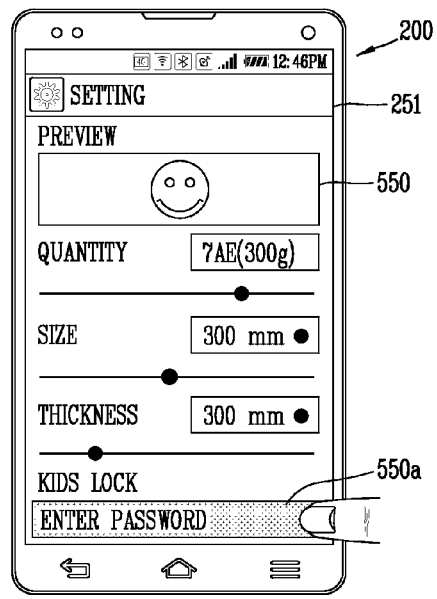
Figure 4C:
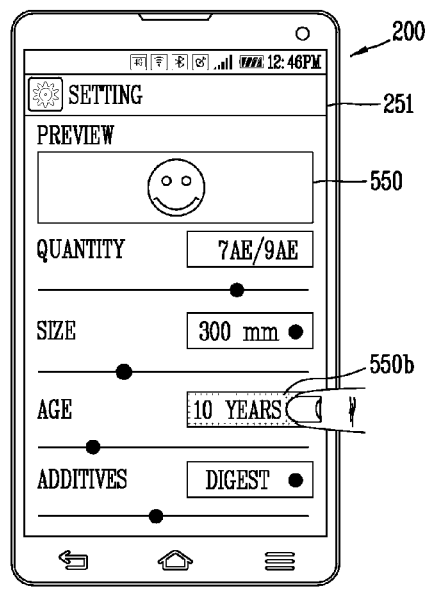
FIGS. 4D(a) and 4D(b) are conceptual views illustrating a control method for controlling an additive added depending on a forming material.
Figure 4C:
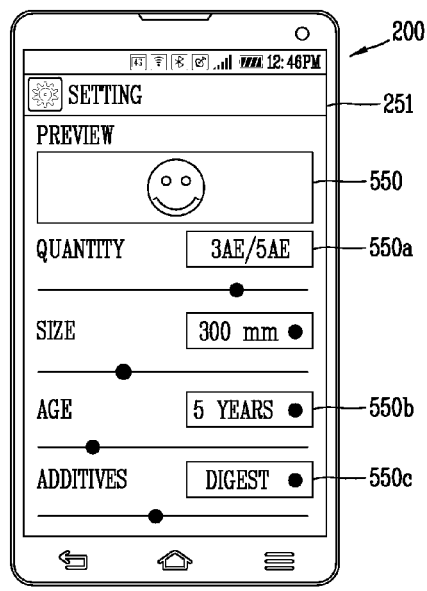
Figure 4C:
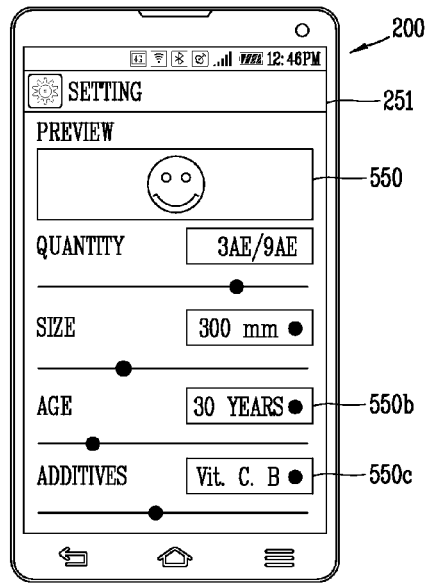

FIGS. 4A to 4C are conceptual views illustrating a control method for forming a 3D object using an edible forming material.

Referring to FIG. 4A, when an edible forming material is selected by the user, the controller 280 may control the display unit 251 to output a fourth control screen 540 for receiving a shape of the 3D object, selected by the user. The fourth control screen 540 may include a plurality of shapes previously stored to be formed of an edible material. The user may select at least one of the previously stored shapes. However, the 3D object is not necessarily printed with only the previously stored shapes.

Referring to FIGS. 4B(a), 4B(b) and 4B(c), when an edible forming material is selected on the material information screen 506, the display unit 251 outputs the fourth control screen 540. The user may select at least one of the shapes of the 3D object, previously stored in the memory 270, on the fourth control screen 540. When a shape of the 3D object to be printed is selected on the fourth control screen 540, the display unit 251 outputs a fifth control screen 550.

Meanwhile, when settings of the 3D object printed by the edible forming material are changed, a locking function for blocking a change in settings, caused by a specific person, and control of the 3D printer 100 may be activated.

That is, if an edible forming material and a shape of the 3D object are selected, the controller 280 controls the display unit 251 to output the fifth control screen 550 including a unlocking window 550a for regulating print settings of the 3D object.

The fifth control screen 550 may include control images for setting a shape selected by the user, a number of the 3D objects, and the size and thickness of the 3D object. The fifth control screen 550 further includes the unlocking window 550a for inputting a password to release a predetermined locking function.

The memory 270 of the control device stores a password set by the user, and the controller 280 controls the locking function to be released by comparing the stored password with a password input to the unlocking window 550a by the user.

When the passwords correspond to each other, the controller 280 controls the 3D printer to be driven by the settings. When the passwords do not correspond to each other, the controller 280 blocks the control of the 3D printer.

The controller 280 may control the display unit 251 to output a warning message that the passwords do not correspond to each other.

Accordingly, if the passwords do not correspond to each other in a state in which the 3D object is set to be formed of a material which children can eat, the printing of the 3D object can be limited. In addition, as the 3D printer is personalized, the locking function can be used for security, where the driving of the 3D printer is limited. Thus, the locking function can be applied even when an inedible forming material is selected.

The fifth control screen 550 according to the exemplary embodiment of FIGS. 4C(a), 4C(b) and 4C(c) may include an age input window 550b for inputting a user's age. The user may input the age of the user or a person to use the 3D object.

The controller 280 may additionally set an additive to be included in the 3D object, based on the age input to the age input window 550b. Here, the additive is made of an edible material. For example, the additive may correspond to a digestive such as a *lactobacillus* for assisting digestion (i.e., degradation) of the 3D object when the user eats the 3D object, or supplementary food (e.g., vitamin, nutrient, etc.) suitable for the age.

Although additives perform the substantially same function, the additives may be controlled to include different materials depending on the age of the user, and the kind and amount of an additive to be added may be controlled by the set number and size (or capacity) of the 3D objects. The fifth control screen 550 may include an additive display part 550c representing the function (or kind) of the additive. The fifth control screen 550 further includes a bar shape representing an amount of the additive and a display part displayed on the bar shape, and the amount of the additive may be adjusted by the user.

Referring to FIG. 4C(b), when the input age is 5 years, the controller 280 may control a digestive (e.g., a *lactobacillus* element or the like) for assisting the digestion of the 3D object to be added as the additive. Referring to FIG. 4C(c), when the input age is 30 years, the controller 280 may control vitamin necessary for a person of 30 years to be added as the additive.

Although not specifically shown in these figures, the controller 280 may control the amount of the additive or change the kind of the additive, based on a user's control command applied to the additive display part 550c.

Accordingly, when the user takes a 3D object formed of an edible material, the user can take an appropriate amount of an additive suitable for the user.

Meanwhile, the controller 280 may change the limitation number of the 3D objects to be printed depending on the intake recommended amount of the forming material, based on the age and the forming material.

According to another exemplary embodiment, in the control device 200, the memory 270 may store user's information. Here, the user's information may include a user's identification (ID), data on user's health state, and data on an additive to be taken according to the user's health state (or to be recommended for the purpose of user's health).

In this case, the fifth control screen 550 may include an ID input window for inputting an ID of a user using the 3D printer. If the user's ID (and a password matched to the user's ID) is (are) input, the controller 280 may change the settings so that an additive is added to the 3D object by the data.

When the 3D object having the additive included therein is printed, the controller 280 may control the memory 270 to additionally store information of the printed 3D object (the size, number, capacity and the like of the 3D objects). That is, the controller 280 may add or change the additive added to the 3D object depending on a person's health state.

Meanwhile, the method of identifying a user using the 3D printer 100 is not limited to the method of inputting an ID. For example, the camera 221 of the control device 200 may photograph a user's face while the fifth control screen is being output. The controller 280 may select user's information through the photographed user's face. Alternatively, the control device 200 may further include a vital sensing part for sensing a user's fingerprint, a user's iris, or the like in order to identify the user.

(Alternatively, the controller 280 may control a corresponding additive to be changed depending on a person's health state.)

(The user's input may be controlled to identify a user as the user's face is photographed by the camera and then immediately recognized. This may be replaced by vital recognition information including a fingerprint, iris or the like.)

Figure 4D:
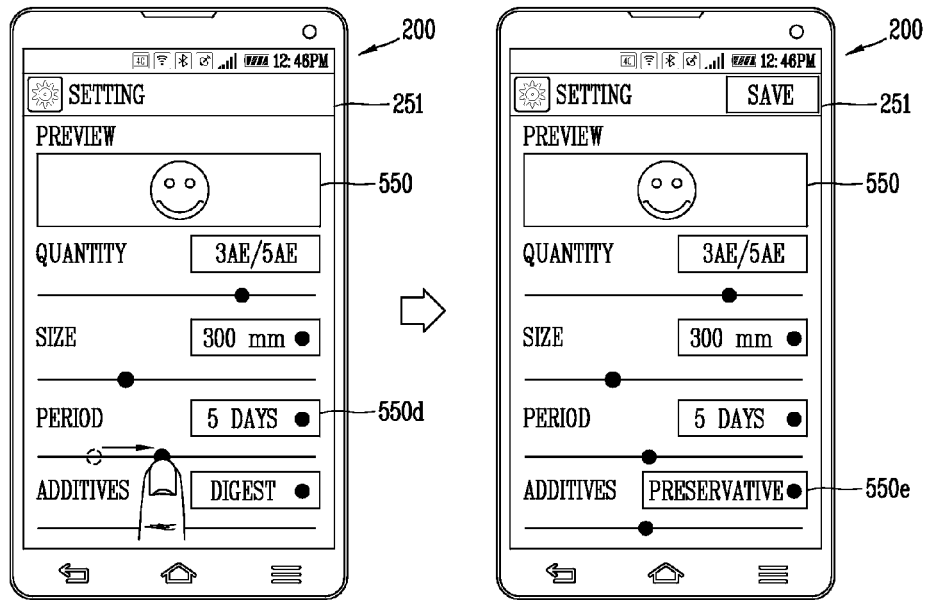
Figure 4D:
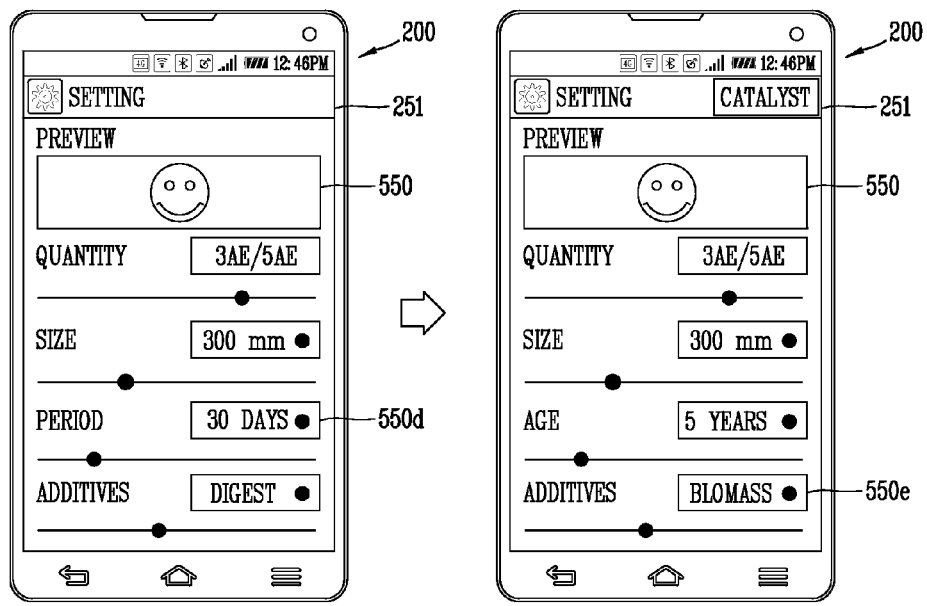

FIGS. 4D(a) and 4D(b) are conceptual views illustrating a control method for controlling an additive added depending on a forming material.

FIG. 4D(a) is a view illustrating a control method when a 3D object is made of an edible forming material. The controller 280 may calculate an available period, based on various settings according to a user's control command, together with the kind of the forming material. The controller 280 may display the calculated available period on a use period control image 550d.

For example, when chocolate is used as a forming material in order to print the 3D object, the controller 280 may calculate, ad the available period, a period until before the 3D object is decayed or deteriorated, by considering the period in which the material can be taken.

The controller 280 may add a preservative as an additive to the use period control image 550d, based on a user's control command to set a use period to be further extended than the available period. When the set use period is longer than the available period based on the control command, the controller 280 controls the display unit 251 to output an addition image 550e for notifying addition of the preservative.

Meanwhile, FIG. 4D (b) is a view illustrating a control method when the 3D object is made of an inedible forming material. The controller 280 may calculate an available period, based on various settings according to a user's control command, together with the kind of the forming material, and display the calculated available period on the use period control image 550d.

For example, the forming material of a 3D object made of plastic may be calculated to have an available period of three days. The controller 280 may control a preservative to be added based on a user's input to reduce the use period of the 3D object. The controller 280 controls the display unit 251 to output the addition image 550e for notifying addition of the preservative. The preservative may include biomass and a catalyst.

That is, the controller 280 may control the 3D printer 100 to add an additive for allowing the 3D object to be used for a set period, based on the use period adjusted by the user.

Accordingly, the 3D object can be formed through the control of a use period, without additionally setting an additive.

Figure 5A:
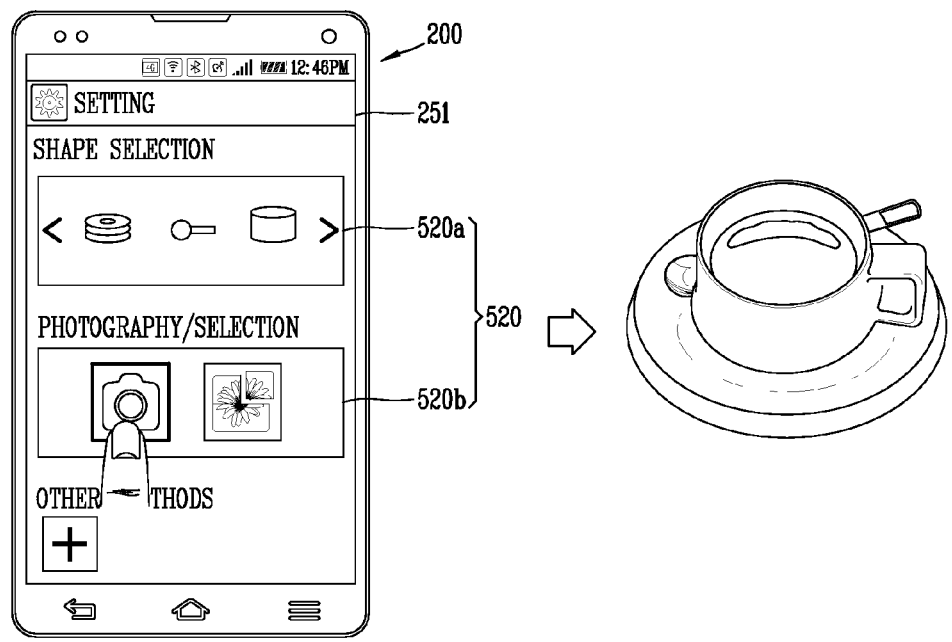
FIGS. 5A(a), 5A(b), 5B(a), 5B(b), 5B(c), 5B(d), 5C(a), 5C(b) and 5C(c) are conceptual views illustrating methods for setting the shapes of 3D objects according to various exemplary embodiments.
Figure 5A:
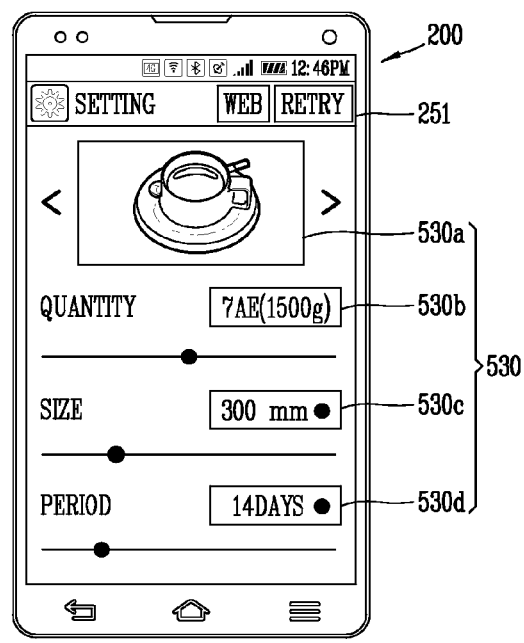
Figure 5B:
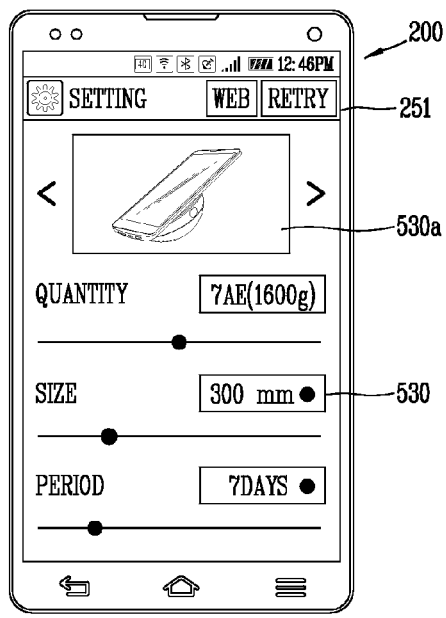
Figure 5B:
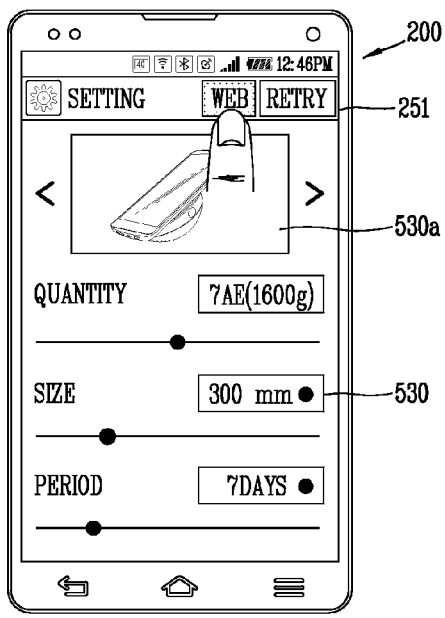
Figure 5B:
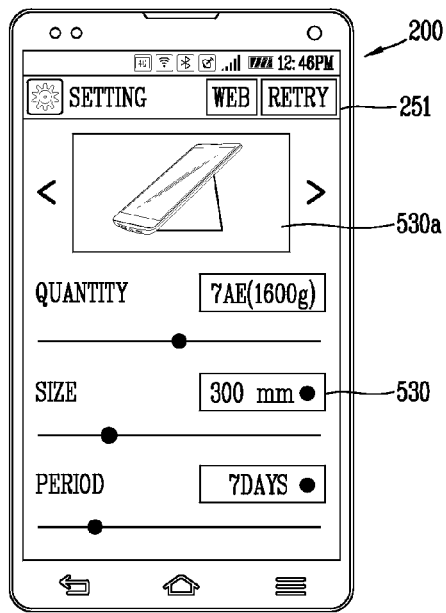
Figure 5B:
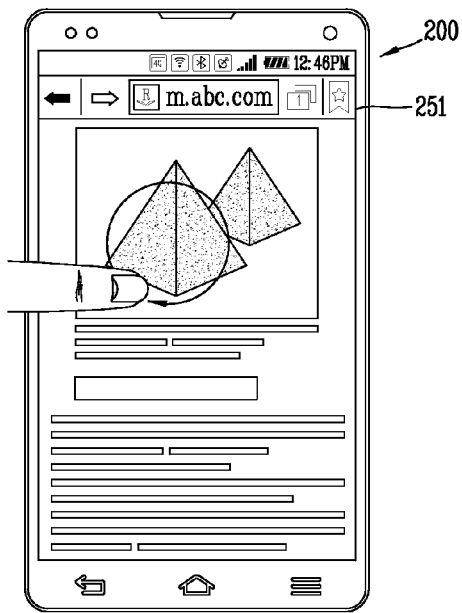
Figure 5C:
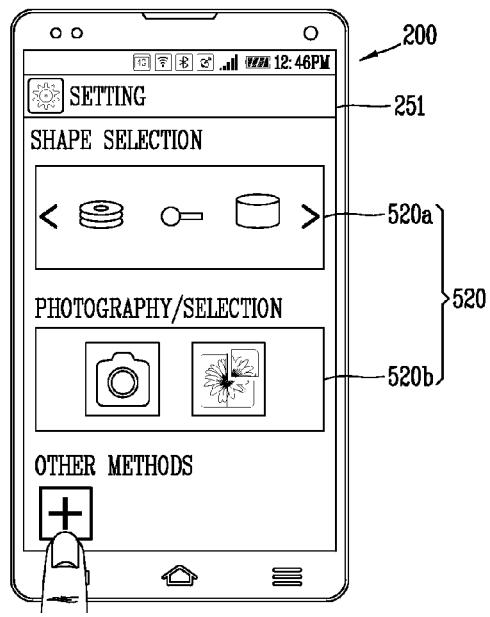
Figure 5C:
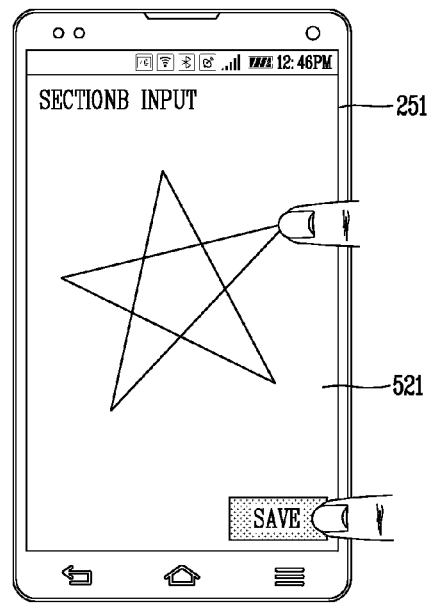
Figure 5C:
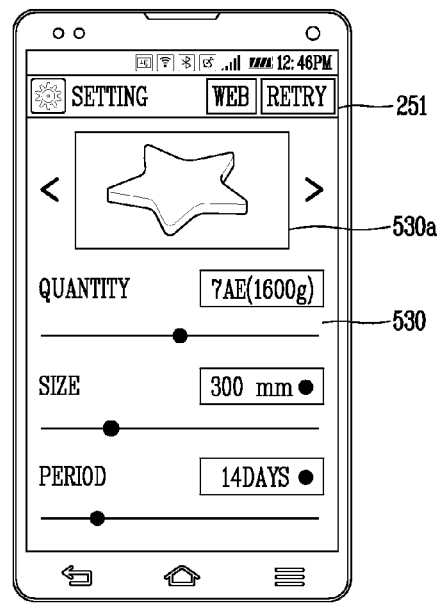

FIGS. 5A to 5C are conceptual views illustrating methods for setting the shapes of 3D objects according to various exemplary embodiments.

FIGS. 5A(a) and 5A(b) are conceptual views illustrating a control method for setting the shape of a 3D object through an image obtained through a camera. The control device 200 according to FIGS. 5A(a) and 5A(b) may further include the camera 221 formed to photograph an image.

The controller 280 activates the camera, based on a touch input applied to the icon 520b in the second control screen 520. The controller 280 may control the control device to photograph an external subject through the activation of the camera. Referring to FIGS. 5A(a) and 5A(b), the subject may correspond to a cup.

The controller 280 simplifies the shape of the photographed subject and forms the simplified shape as an image.

The controller 280 outputs the image of the shape of the subject as the first control image 530a on the third control screen 530 (see FIGS. 3B(a) and 3B(b)). The components of the third control screen 530 are substantially identical to those of the third control screen 530 of FIGS. 3B(a) and 3B(b). Therefore, the components of the third control screen 530 are designated by like reference numerals, and their detailed descriptions will be omitted to avoid redundancy.

In FIGS. 5A(a) and 5A(b), it has been illustrated that one subject is photographed. However, when a plurality of subjects are included in the photographed image and formed as images, the controller 280 may control the image of at least one subject to be selected as the shape of the 3D object.

Accordingly, the user can set the shape of the 3D object, using a photographable object as well as the previously stored shapes. Thus, a 3D object similar to the desired object can be output by the 3D printer 100.

FIGS. 5B(a), 5B(b), 5B(c) and 5B(d) are conceptual views illustrating a control method for setting the shape of a 3D object using an image obtained through searching.

The display unit 251 outputs a third control screen 530 including a first control image 530a. The third control screen 530 is substantially identical to the third control screen 530 of FIGS. 3B(a), 3B(b), 3B(c) and 3B(d), and therefore, its detailed descriptions will be omitted to avoid redundancy.

The third control image 530 includes a graphic image (WEB) for receiving a touch input in order to output a web page for performing web searching. The controller 280 outputs a web page, based on a touch input applied to the graphic image (WEB).

The controller 280 may apply, as the shape of the 3D object, a portion of an image searched by the web page and selected by the user. For example, the 3D object may correspond to a cellular phone and a stand of the cellular phone, and the searched image may include a pyramid.

The controller 280 may allow the image to be included in the first control image 530a, based on a control command of selecting the shape of the pyramid on the image. The user may synthesize a portion of the image on the first control image 530a.

The controller 280 may form, as the shape of the 3D object, the first control image 530 on which the portion of the image is synthesized. That is, the stand of the cellular phone in the 3D object may be printed in the shape of the pyramid.

However, in addition to the image searched on the web page, an image stored in the memory of the control device may also be synthesized together with another shape, to be set as the shape of the 3D object. Accordingly, the user may form portions of the 3D object through a combination of images obtained from different sources.

FIGS. 5C(a), 5C(b) and 5C(c) are conceptual views illustrating a control method for setting, as a section of a 3D object, a 2D figure input by the user.

The controller 280 controls the display unit 251 to provide an input window 521 for receiving a user's touch input for inputting a figure, based on a control command applied to the second control screen 520 (see FIG. 3A). The components included in the second control screen 520 are substantially identical to those of the third control screen 520 of FIG. 3A, and therefore, their detailed descriptions will be omitted to avoid redundancy.

The display unit 251 may form an image to correspond to the user's touch input. The controller 280 outputs the image as the first control image 530a of the third control screen 530.

The controller 280 may control the size, thickness and the like of the 3D object, based on a control command applied to the third control screen 530. The controller 280 may control the display unit 251 to change the shape of the first control image 530a, corresponding to the size and thickness.

Accordingly, the user can directly draw a 2D section of a desired shape, and print a 3D object according to the drawn 2D section.

Figure 6A:
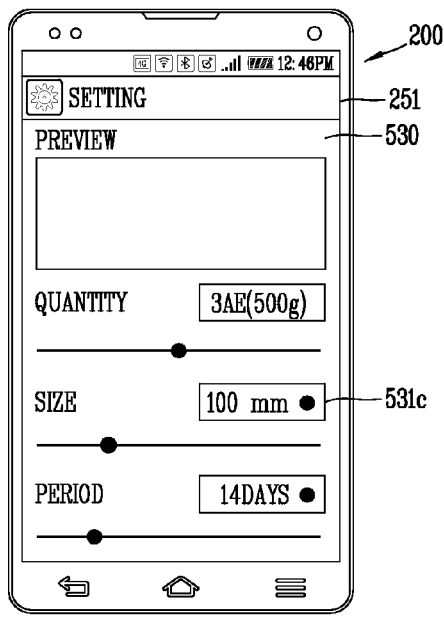
FIGS. 6A(a), 6A(b), 6A(c) and 6B are conceptual views illustrating a control method for setting the size of a 3D object.
Figure 6A:
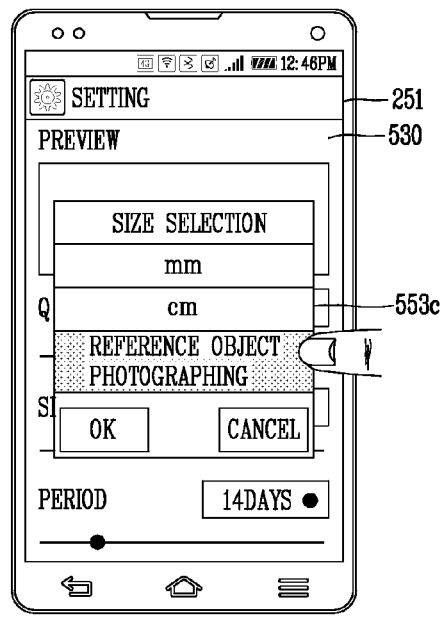
Figure 6A:
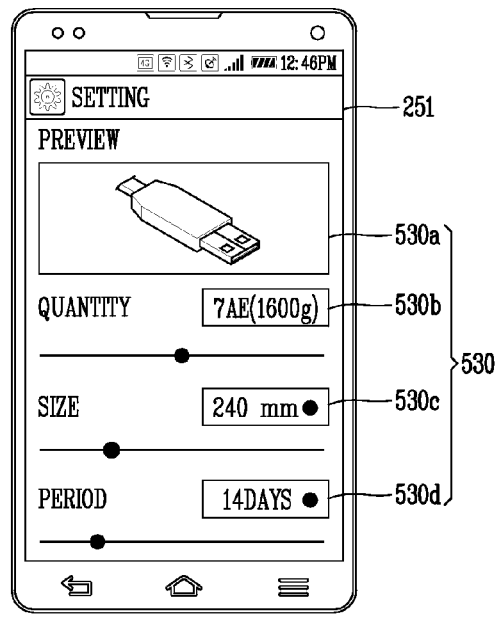
Figure 6B:
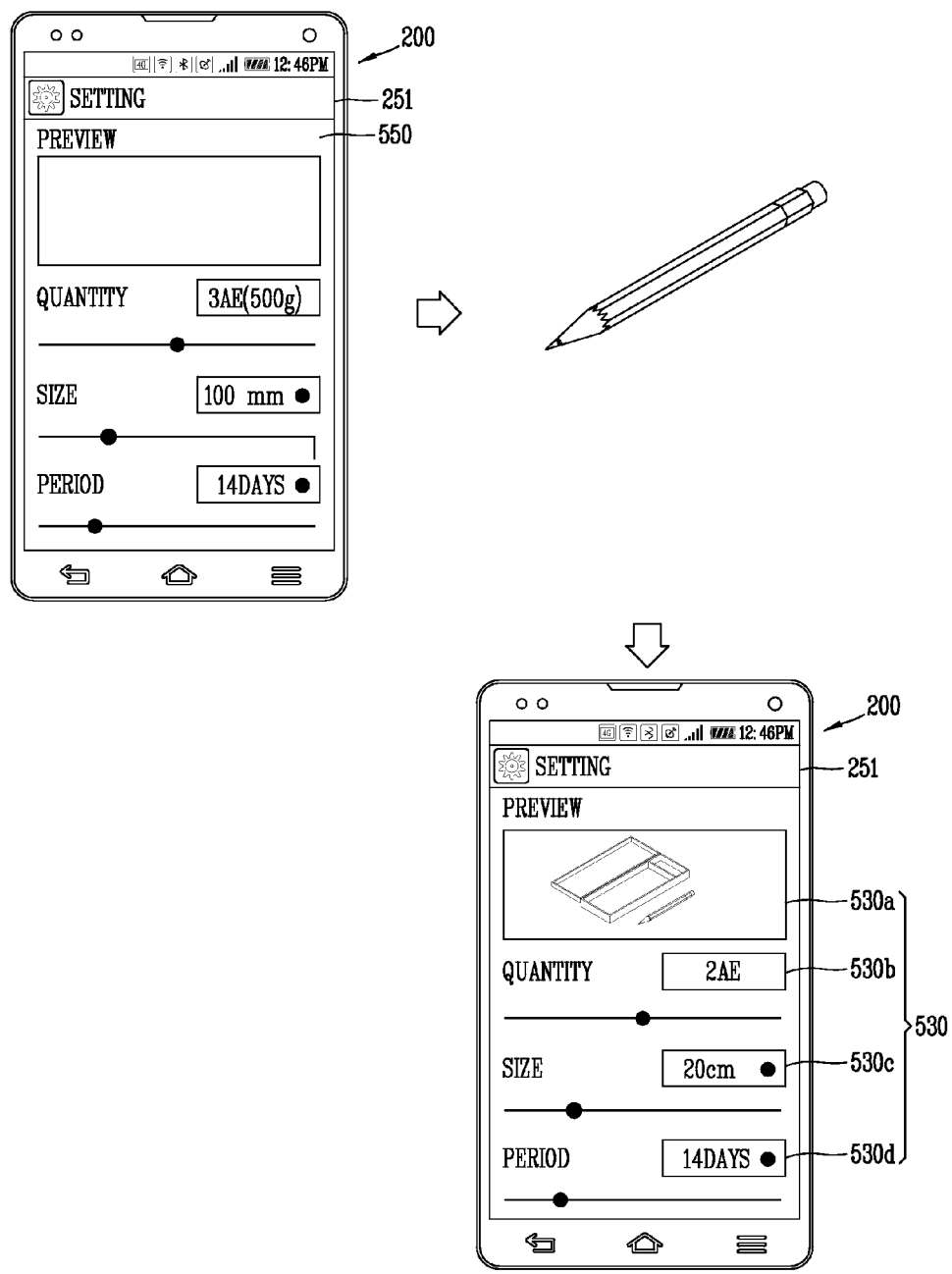

FIGS. 6A and 6B are conceptual views illustrating a control method for setting the size of a 3D object.

Referring to FIGS. 6A(a), 6A(b), 6A(c), a control method for setting the size of a 3D object, based on a standardized object of which reference size information is stored. The third control screen 530 may further include a numerical value display part 531c for displaying the size of the 3D object as a numerical value. The numerical value display part 531 displays together a number and a unit, which represent a size set by a user's control command.

The controller 280 may change the unit, based on a touch input applied to the numerical value display part 531c. That is, if a touch input is applied to the numerical value display part 531c, the display unit 251 outputs a unit list 553c.

The controller 280 activates the camera included in the control device, based on a touch input applied to 'REFERENCE OBJECT PHOTOGRAPHING' included in the unit list 553c. The user photographs a standardized object in order to apply a standardized size to the 3D object. For example, the standardized object corresponds to an electronic product such as a connector, a bottle cap, stationery such as a pencil lead, a kitchen utensil, etc. However, the standardized object is not limited to a specific object.

The controller 280 controls the size of the 3D object to be printed, based on the photographed object. When the size of the 3D object is controlled by the standardized object, the size of the 3D object cannot be changed based on a user's touch input. For example, when a touch input for adjusting the size of the 3D object is received, the controller 280 may output a warning message that the size of the 3D object is out of the standardized size.

That is, when the standardized object is to be substantially identically printed, an obtained image may be analyzed, and the corresponding size information may be applied to the 3D object, without user's adjusting the size of the 3D object.

Accordingly, the user can more conveniently obtain a 3D object for a desired purpose. When the obtained 3D object is used together with another object, it is possible to prevent a problem caused by an error with respect to the size of the 3D object.

A control method for setting the size of a 3D object through the size of a stuff used together with the 3D object will be described with reference to FIG. 6B. The controller 280 activates the camera, based on a touch input applied to the 'REFERENCE OBJECT PHOTOGRAPHING' in the unit list 553c.

The controller 280 photographs an image of an object to be compared through the camera. The controller 280 may measure the size of the object to be compared when the object to be compared is photographed by the camera. For example, the control device may include a sensor for sensing a distance from the camera to a subject, and the controller 280 may predict the distance and the size of the object to be compared, using the sensor.

The controller 280 outputs, as the first control image 530a, the image of the object to be compared together with the shape of the 3D object. The controller 280 controls the size of the 3D object, based on the size of the object to be compared. The user may adjust the size of the 3D object with respect to the object to be compared, based on a touch input applied to the first control image 530a.

The object to be compared preferably corresponds to an object available together with the 3D object, but the present invention is not limited thereto. For example, the object to be compared may correspond to a pencil, and the 3D object may correspond to a pencil case for accommodating pencils.

Figure 7A:
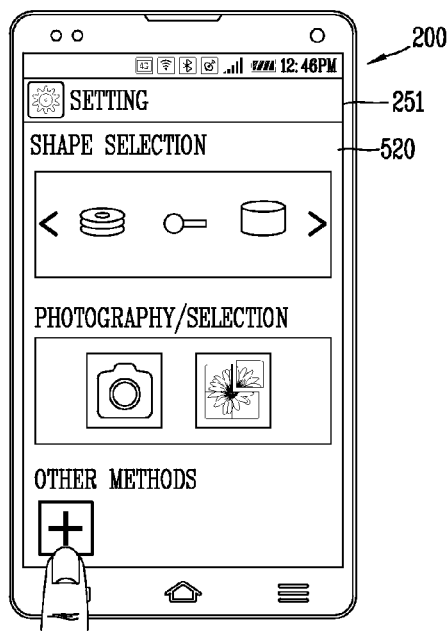
FIGS. 7(*a*), 7(*b*) and 7(*c*) are conceptual views illustrating a control method for setting the shape of a 3D object depending on a function of the 3D object.
Figure 7B:
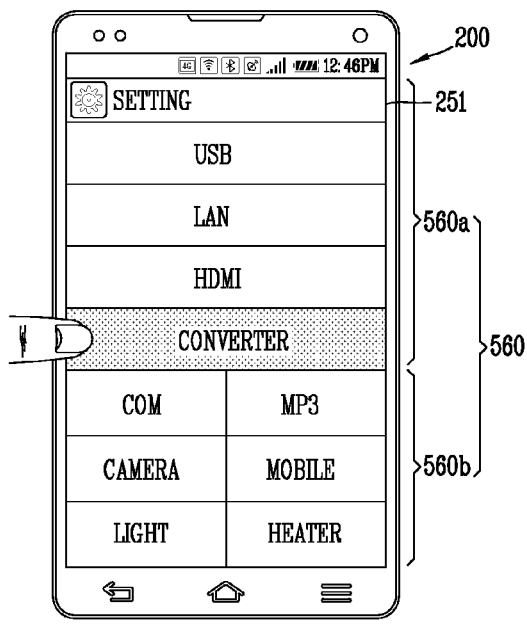
Figure 7C:
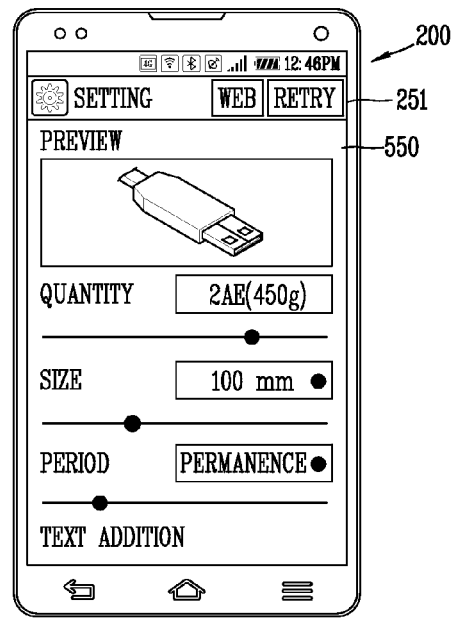

FIGS. 7(a), 7(b) and 7(c) are conceptual views illustrating a control method for setting the shape of a 3D object depending on a function of the 3D object. The controller 280 controls the display unit 251 to output a function setting window 560, based on a control command applied to the second control screen 520.

The function setting window 560 includes an object 560a with respect to a specific function of a 3D object to be printed. For example, an object of which function can be performed on when including a standardized structure such as USB, LAN or HDMI may be included in the object 560a. However, the present invention is not limited thereto. For example, an object such as scissors which is not standardized but has a standardized shape may be included in the object 560a.

The function setting window 560 may further include an item for selecting a specific function 560b. For example, the specific function 560b may correspond to a converter for converting a signal by electrically connecting electronic components formed with different standards. If the converter is selected, the display unit 251 may output a plurality of electronic devices to be connected. That is, the controller 280 may control the display unit 251 to additionally output a selection window for selecting a condition for performing the specific function.

The controller 280 may set a 3D object of an appropriate shape, based on the condition and specific function selected by the selection window. Accordingly, the user can print a 3D object suitable for use without any shape or image of an object required to perform a desired function.

Figure 8A:
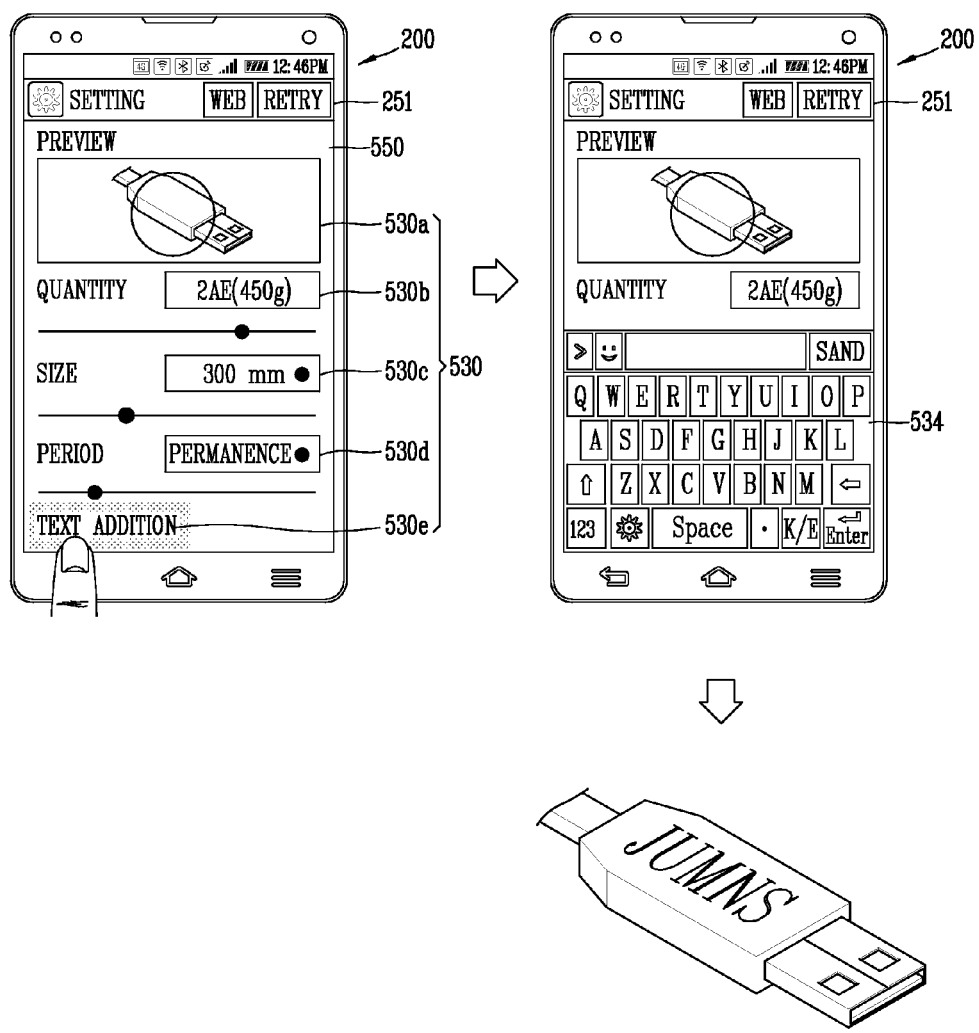
FIGS. 8A and 8B are conceptual views illustrating a control method for additional edition of the exterior and interior of a 3D object.
Figure 8B:
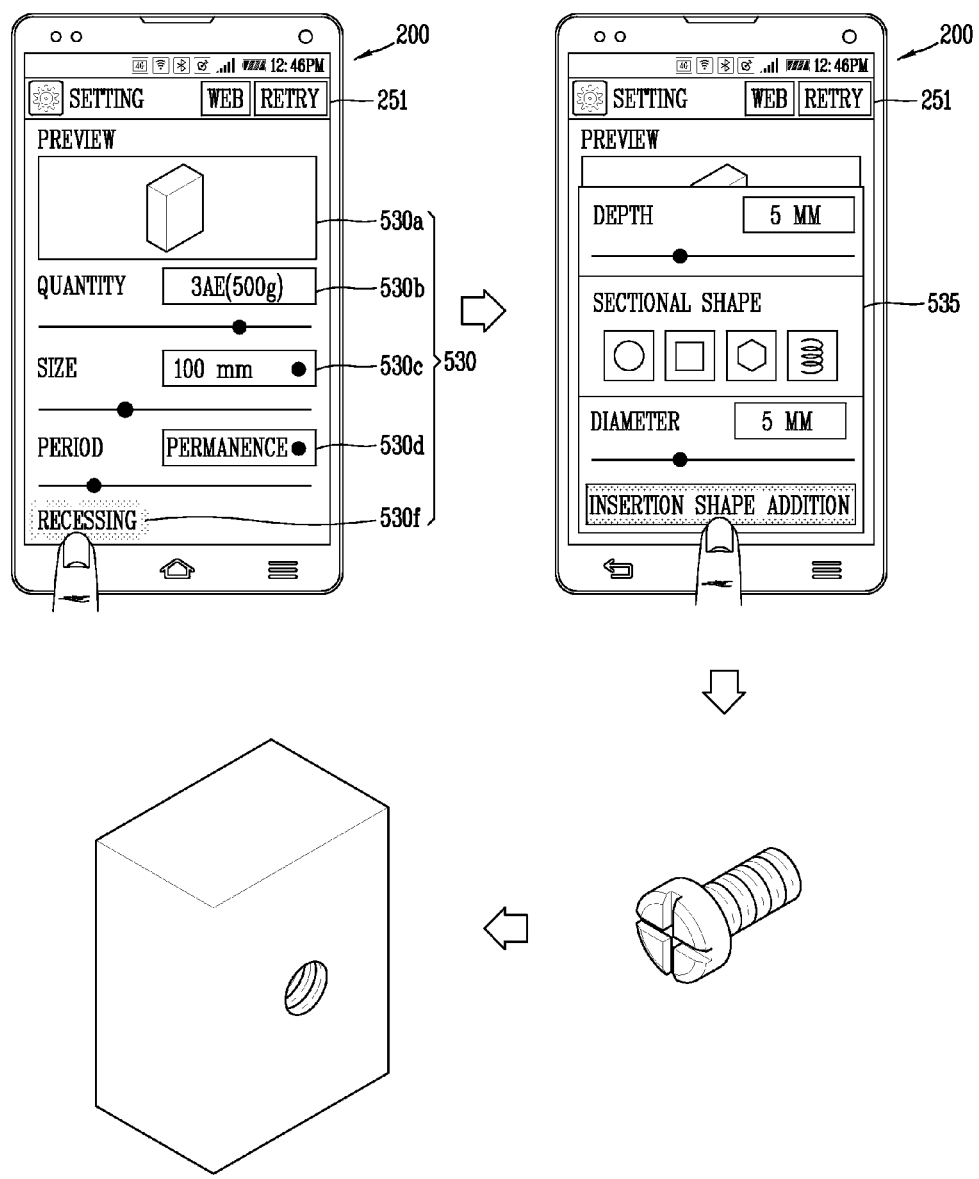

FIGS. 8A and 8B are conceptual views illustrating a control method for additional edition of the exterior and interior of a 3D object.

A control method for editing the exterior of a 3D object will be described with reference to FIG. 8A. The controller 280 may control the display unit 251 to output a text input window 534 for inputting a text, based on a touch input applied to a fifth control image 530e included in the third control screen 530 to form the text on the exterior of the 3D object.

For example, the text input window 534 may include a virtual keyboard for receiving a user's touch input or a writing input part for outputting an image according to the user's touch input. The controller 280 may control the display unit 251 to receive a text input based on a touch input applied to the virtual keyboard and output the text on the first control image 530a.

The text formed on the exterior of the 3D object may be formed using a material distinguished from that of the 3D object on the exterior of the 3D object or be formed engraved on the exterior of the 3D object.

For example, the user may put the user's name on the 3D object or input the date when the 3D object is printed, the use of the 3D object, etc. Accordingly, it is possible to minimize a problem and confusion, caused by an increase in printing of the 3D object and confusion.

A control method for editing the interior of a 3D object will be described with reference to FIG. 8B. The third control screen 530 includes a sixth control image 530f for editing the internal shape of the 3D object. The display unit 251 outputs an internal structure setting window 535, based on a touch input applied to the sixth control image 530f. The depth of the internal structure, the shape of the section of the internal structure and the diameter of the section may be selected by the internal structure setting window 535. One surface to allow the internal structure to be edited may be selected based on a touch input applied to the first control image 530a.

Here, the internal structure may include a structure formed by being recessed from the exterior of the 3D object and a structure not exposed to the exterior of the 3D object.

Meanwhile, the internal structure of the 3D object may be set by selecting an insertion shape inserted into or connected to the internal structure formed in the 3D object. The insertion shape may be photographed by the camera or be selected by an obtained image.

The controller 280 may set the internal structure, based on the selected insertion shape. According to the exemplary embodiment, when the user desires to form an internal structure which does not have a specific function but has a desired shape, the user can easily set the shape of the internal structure, thereby printing a 3D object having various structures.

Figure 9A:
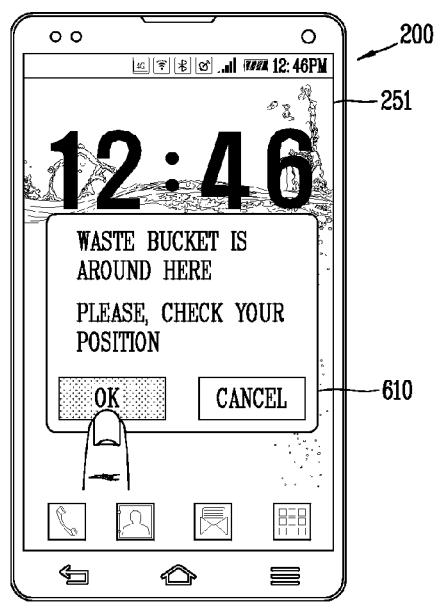
FIGS. 9A(a), 9A(b), 9B(a), 9B(b) and 9B(c) are conceptual views illustrating a discard information notifying method for discard of a 3D object.
Figure 9A:
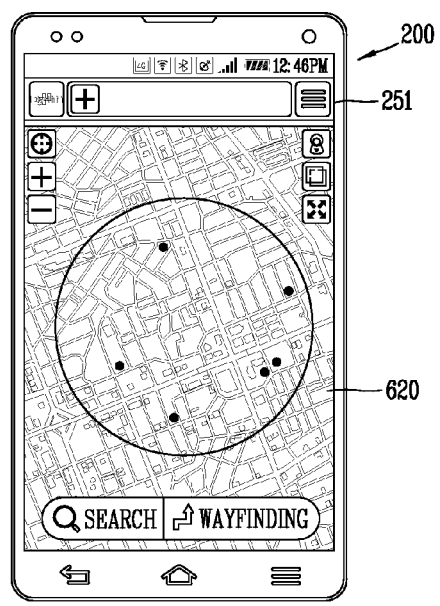
Figure 9B:
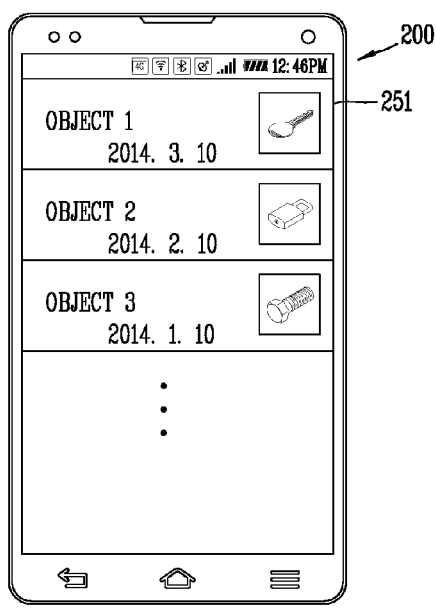
Figure 9B:
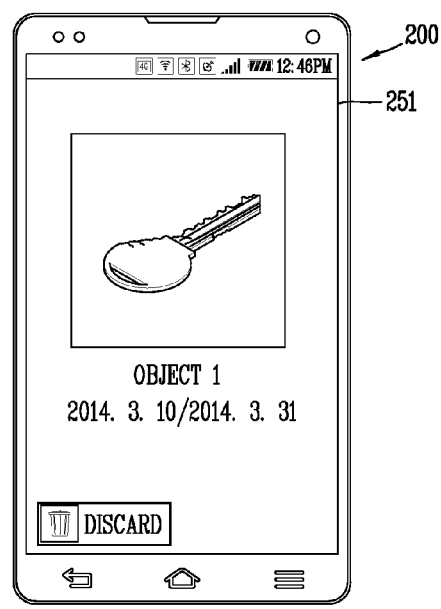
Figure 9B:
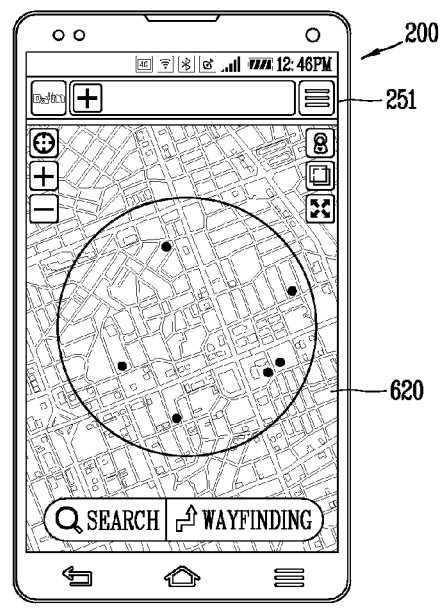

FIGS. 9A and 9B are conceptual views illustrating a discard information notifying method for discard of a 3D object.

Referring to FIGS. 9A(a) and 9A(b), a control method for providing discard information for discarding a 3D object will be described according to an exemplary embodiment. When the use period of the 3D object exceeds, the controller 280 controls the display unit 251 to output a notification message 610 for discarding the 3D object.

The controller 280 may control the memory to store information on a plurality of printed 3D objects. For example, the memory may store the printing date of the 3D object, the use period of the 3D object, and the like. If the use period of the 3D object comes near, the controller 280 may control the display unit 251 to output the notification message 610.

The notification message 610 may correspond to a message for confirming a place where the 3D object can be discarded.

The display unit 251 may output a map image 620 including information on a space in which the 3D object can be discarded. For example, as the printing and use of the 3D object increase, a discarding place may be specified based on the kind of the 3D object. The controller 280 may output the discarding place by analyzing the 3D object to be discarded.

Accordingly, the user can recognize a 3D object required to be discarded, and discard the 3D object at an appropriate position. Thus, it is possible to minimize a problem caused by an increase in waste according to the use of a disposable 3D object.

A control method for providing information of a printed 3D object will be described with reference to FIGS. 9B(a), 9B(b) and 9B(c).

The display unit 251 may output screen information 630 including information on a plurality of 3D objects printed in the 3D printer. The screen information 630 may include images, printing dates, degradation expectation periods and dates with respect to the plurality of 3D objects.

The controller 280 may control the display unit 251 to output the screen information 630 in a situation such as when the discarding time of any one of the plurality of 3D objects comes near or when the period set by the user comes near.

When one 3D object is selected by the screen information 630, the controller 280 may control the display unit 251 to output low-level information 631 including detailed information on the 3D object. For example, the low-level information 631 may include a current state image of the 3D image expected based on a current date and a printing date or a degradation expectation period and date, a printing data of the 3D object, a degradation expectation period, a use period, components, a use of the 3D object, and the like.

When a user's control command for discarding the 3D object is applied, the controller 280 may control the display unit 251 to output a map image 620 including a place where the 3D object can be discarded.

Accordingly, the user can manage the printed object, and more easily recognize and use a large number of printed 3D object.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A system comprising:
    a three-dimensional printer for printing a three-dimensional object, the three-dimensional printer including a body and a supply unit for supplying a forming material and a degradable agent formed inside the body; and
    a control device communicatively coupled to the three-dimensional printer, the control device comprising:
        a display unit for displaying screen information for setting a use period of the three-dimensional object;
        a controller for determining an amount of the degradable agent to be added to the three-dimensional object based on the set use period and for generating a control signal for controlling the three-dimensional printer, the control signal being indicative of the determined amount of the degradable agent;

communication unit for transmitting the control signal to the three-dimensional printer; and a memory for storing data of a printed three-dimensional object, wherein the controller controls the display unit to display discard information for discarding the printed three-dimensional object based on the stored data;

wherein the forming material is composed of at least one of a first edible material or a second inedible material, and the degradable agent is composed of a plurality of degradable materials, and wherein the controller generates the control signal to control the three-dimensional printer to print the three-dimensional object with some of the plurality of degradable materials based on the first and second materials;

wherein, the display displays an available period of the three-dimensional object, the available period calculated based on the use period and a size or capacity of the three-dimensional object set by a user when the three-dimensional object is set to be formed of a biodegradable material degrading as time elapses, and wherein the controller determines the amount of the degradable agent to be added to the three-dimensional object based on the available period of the three-dimensional object and the use period set by the user.

2. The system of claim 1, wherein the controller controls a size of the three-dimensional object based on a remaining amount of the forming material and the use period.

3. The system of claim 2, wherein the screen information includes a control image for setting a number of three-dimensional objects, and wherein the controller generates the control signal to control the number of the three-dimensional objects, the size of the three-dimensional object and the use period of the three-dimensional object.

4. The system of claim 1, wherein the screen information includes a control image that includes a shape corresponding to the three-dimensional object, and wherein at least one of a shape and a size of a portion of the three-dimensional object is changed based on a touch input applied to one area of the control image.

5. The system of claim 4, wherein the control image corresponds to a portion of a photograph obtained by imaging an object.

6. The system of claim 1, wherein the control device further comprises a camera for obtaining an image of an object, wherein the controller sets a size of the three-dimensional object based on the image of the object obtained by the camera.

7. The system of claim 6, wherein the memory further stores standard information of the imaged object, wherein the controller sets the size of the three-dimensional object based on the standard information.

8. The system of claim 1, wherein the display unit further displays a shape selected by a user, and wherein the controller sets an internal structure recessed to correspond to the shape from one surface of the three-dimensional object.

9. The system of claim 1, wherein the memory further stores information on a function and a shape of the three-dimensional object, wherein the display unit further displays a function setting window including information on at least one function to allow the function of the three-dimensional object to be selected, and wherein the controller generates the control signal to control the three-dimensional printer to print the three-dimensional object in a shape corresponding to the function selected by the function setting window.

10. The system of claim 1, wherein the controller determines an amount of a degradation prevention material to be added to the three-dimensional object for suppressing the degradation when the three-dimensional object is set to include the first material based on the available use wherein the control signal generated by the controller is indicative of the determined amount of the degradation prevention material.

11. The system of claim 1, wherein the display unit further displays an age input window for receiving a user's age when a component of the three-dimensional object is composed of the first material.

12. The system of claim 11, wherein the controller changes a printing number of three-dimensional objects and a size or capacity of the three-dimensional object based on the user's age.

13. The system of claim 11, wherein the controller determines an amount of an additive to be added to the three-dimensional object based on the user's age, wherein the additive includes at least one of a vitamin element or a digestive element, and wherein the control signal generated by the controller is indicative of the determined amount of the additive.

14. The system of claim 11, wherein the display unit further displays a password input window for receiving a password input by the user when the component of the three-dimensional object is composed of the first material, and wherein the controller activates a locking function of limiting control of the three-dimensional printer when the input password does not correspond to a previously set password.

15. The system of claim 1, wherein the display unit further displays a text input window for receiving a text formed on an outer surface of the three-dimensional object.

16. The system of claim 1, wherein-the discard information includes a position where the printed three-dimensional object is discarded.

17. The system of claim 1, wherein the stored data of the three-dimensional object include at least one of a printing date of the three-dimensional object, a material constituting the three-dimensional object, a use period of the three-dimensional object, or a use of the three-dimensional object.

* * * * *